United States Patent
Koshiba

(10) Patent No.: US 9,754,375 B2
(45) Date of Patent: Sep. 5, 2017

(54) IMAGE PROCESSING APPARATUS, IMAGE PROCESSING METHOD, AND NON-TRANSITORY STORAGE MEDIUM STORING IMAGE PROCESSING PROGRAM

(71) Applicant: OLYMPUS CORPORATION, Shibuya-ku, Tokyo (JP)

(72) Inventor: Osamu Koshiba, Chiba (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/980,743

(22) Filed: Dec. 28, 2015

(65) Prior Publication Data
US 2016/0148385 A1 May 26, 2016

Related U.S. Application Data

(63) Continuation of application No. PCT/JP2014/066467, filed on Jun. 20, 2014.

(30) Foreign Application Priority Data

Jun. 25, 2013 (JP) .................................. 2013-133099

(51) Int. Cl.
*G06K 9/00* (2006.01)
*G06T 7/00* (2017.01)
(Continued)

(52) U.S. Cl.
CPC ............ *G06T 7/0048* (2013.01); *G06T 5/002* (2013.01); *G06T 7/248* (2017.01); *G06T 7/74* (2017.01);
(Continued)

(58) Field of Classification Search
CPC .... G06T 7/74; G06T 7/77; G06T 7/90; G06T 7/248; G06T 7/0048; G06T 5/002;
(Continued)

(56) References Cited

U.S. PATENT DOCUMENTS 8,290,280 B2 * 10/2012 Kanda ..................... G06T 7/248
382/173
9,008,174 B2 * 4/2015 Zheng .................. H04N 19/105
375/240.12
(Continued)

FOREIGN PATENT DOCUMENTS

JP 2001086517 A 3/2001
JP 2005079843 A 3/2005
JP 2007143131 A 6/2007

OTHER PUBLICATIONS

International Preliminary Report on Patentability (IPRP) including Written Opinion (in English) dated Jan. 7, 2016, issued in parent International Application No. PCT/JP2014/066467.
(Continued)

*Primary Examiner* — Ali Bayat
(74) *Attorney, Agent, or Firm* — Holtz, Holtz & Volek PC

(57) ABSTRACT

A similarity calculation unit calculates a similarity between pixel values of a target pixel and a reference pixel and a similarity between the pixel value of the target pixel and an average value of pixel values of reference pixels, in an input image. A weighting factor calculation unit calculates weighting factors based on the calculated similarities. A weighted average value calculation unit calculates weighted average values of the pixel value of the reference pixel and the average value of the pixel values of the reference pixels by use of the calculated weighting factors. A subtraction unit calculates a difference value between the pixel values of the target pixel and the reference pixel. An isolation degree calculation unit calculates an isolation degree based on the calculated deference value. A correction unit corrects the target pixel based on the calculated isolation degree.

13 Claims, 17 Drawing Sheets

(51) Int. Cl.

| | |
|---|---|
| *H04N 5/367* | (2011.01) |
| *H04N 9/07* | (2006.01) |
| *G06T 5/00* | (2006.01) |
| *H04N 1/58* | (2006.01) |
| *H04N 1/64* | (2006.01) |
| *H04N 9/04* | (2006.01) |
| *G06T 7/73* | (2017.01) |
| *G06T 7/77* | (2017.01) |
| *G06T 7/246* | (2017.01) |
| *G06T 7/90* | (2017.01) |

(52) U.S. Cl.
CPC .................. *G06T 7/77* (2017.01); *G06T 7/90* (2017.01); *H04N 1/58* (2013.01); *H04N 1/648* (2013.01); *H04N 5/367* (2013.01); *H04N 9/045* (2013.01); *H04N 9/07* (2013.01)

(58) Field of Classification Search
CPC .......... G06T 2207/20192; H04N 1/648; H04N 1/58; H04N 5/367; H04N 19/105
See application file for complete search history.

(56) References Cited

U.S. PATENT DOCUMENTS

| | | | |
|---|---|---|---|
| 9,129,188 B2* | 9/2015 | Hata | ..................... G06K 9/4652 |
| 9,330,442 B2* | 5/2016 | Kang | ...................... G06T 5/002 |
| 2005/0047658 A1 | 3/2005 | Kita | |
| 2006/0056722 A1* | 3/2006 | Moroney | ................... G06T 5/20 |
| | | | 382/266 |
| 2007/0091187 A1 | 4/2007 | Lin | |
| 2013/0342644 A1* | 12/2013 | Rusanovskyy | ...... H04N 19/597 |
| | | | 348/43 |
| 2015/0269711 A1* | 9/2015 | Ohishi | ................... G06T 5/002 |
| | | | 382/132 |

OTHER PUBLICATIONS

Internaitonal Search Report (ISR) dated Aug. 12, 2014 issued in International Application No. PCT/JP2014/066467.
Roman Garnett, et al., "A Universal Noise Removal Algorithm with an Impulse Detector", 7 Pages.

* cited by examiner

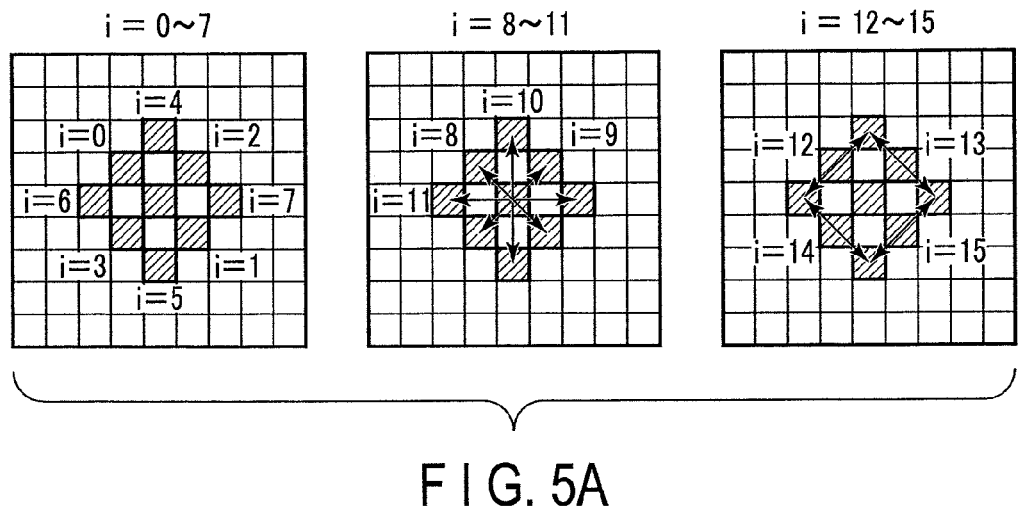
F I G. 5A
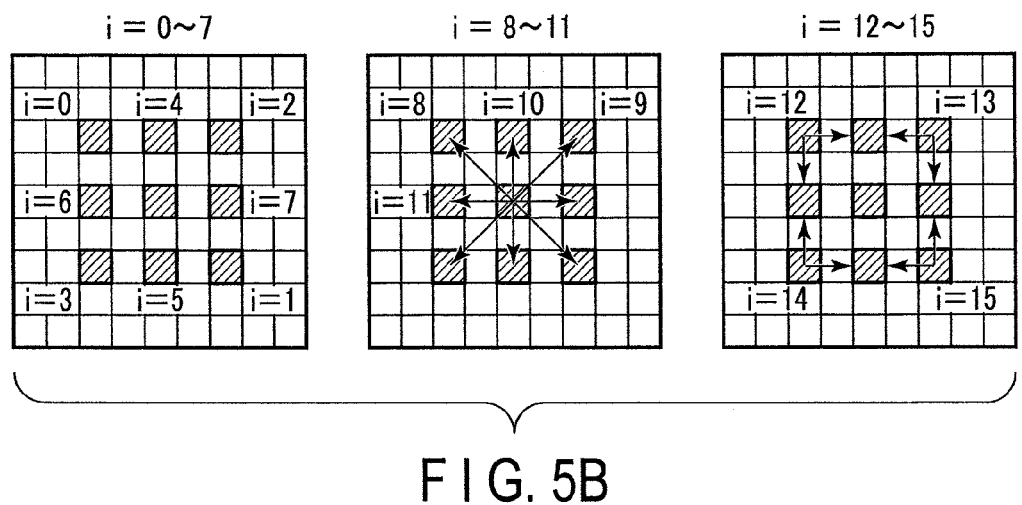
F I G. 5B

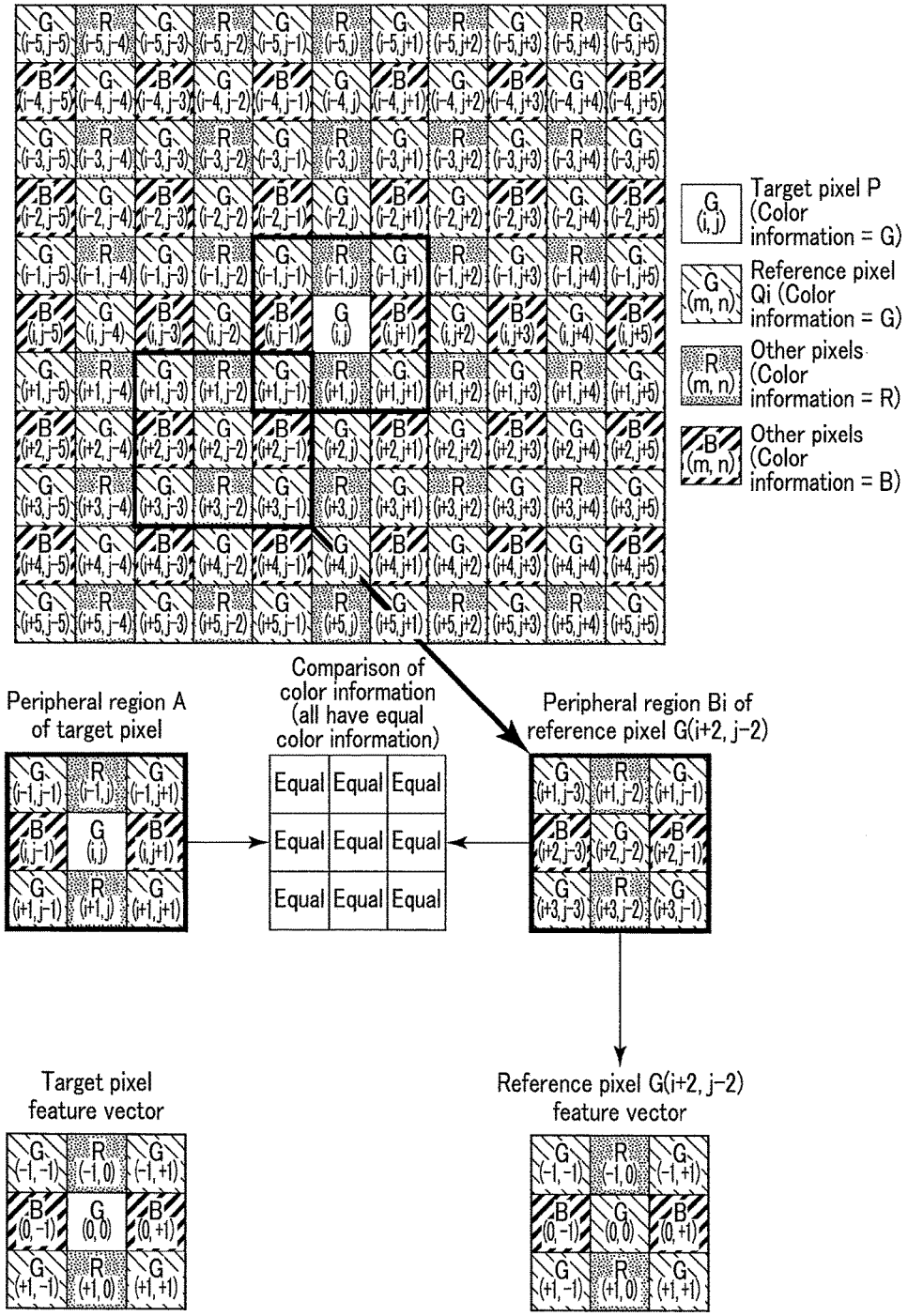
F I G. 10

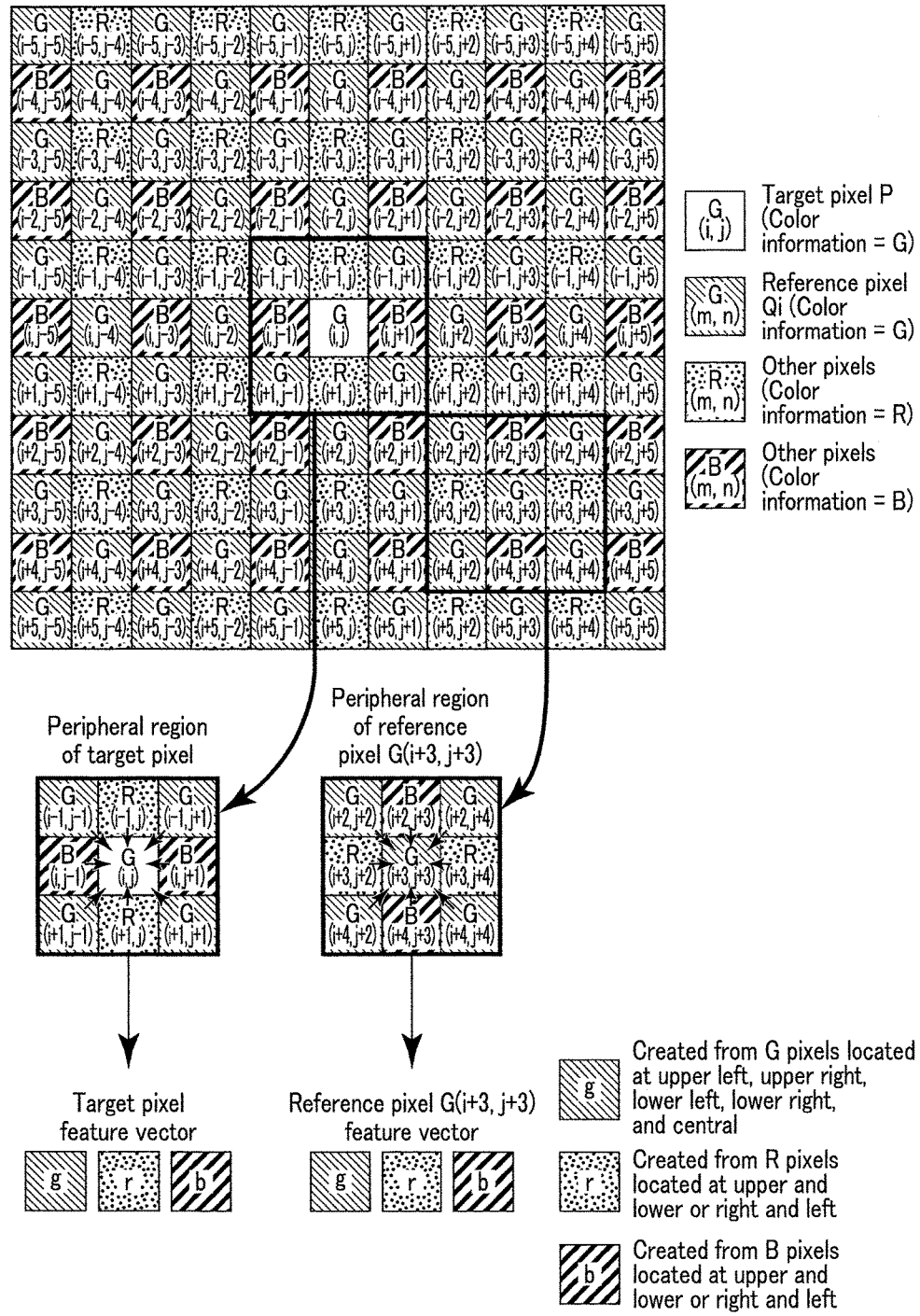
F I G. 16A

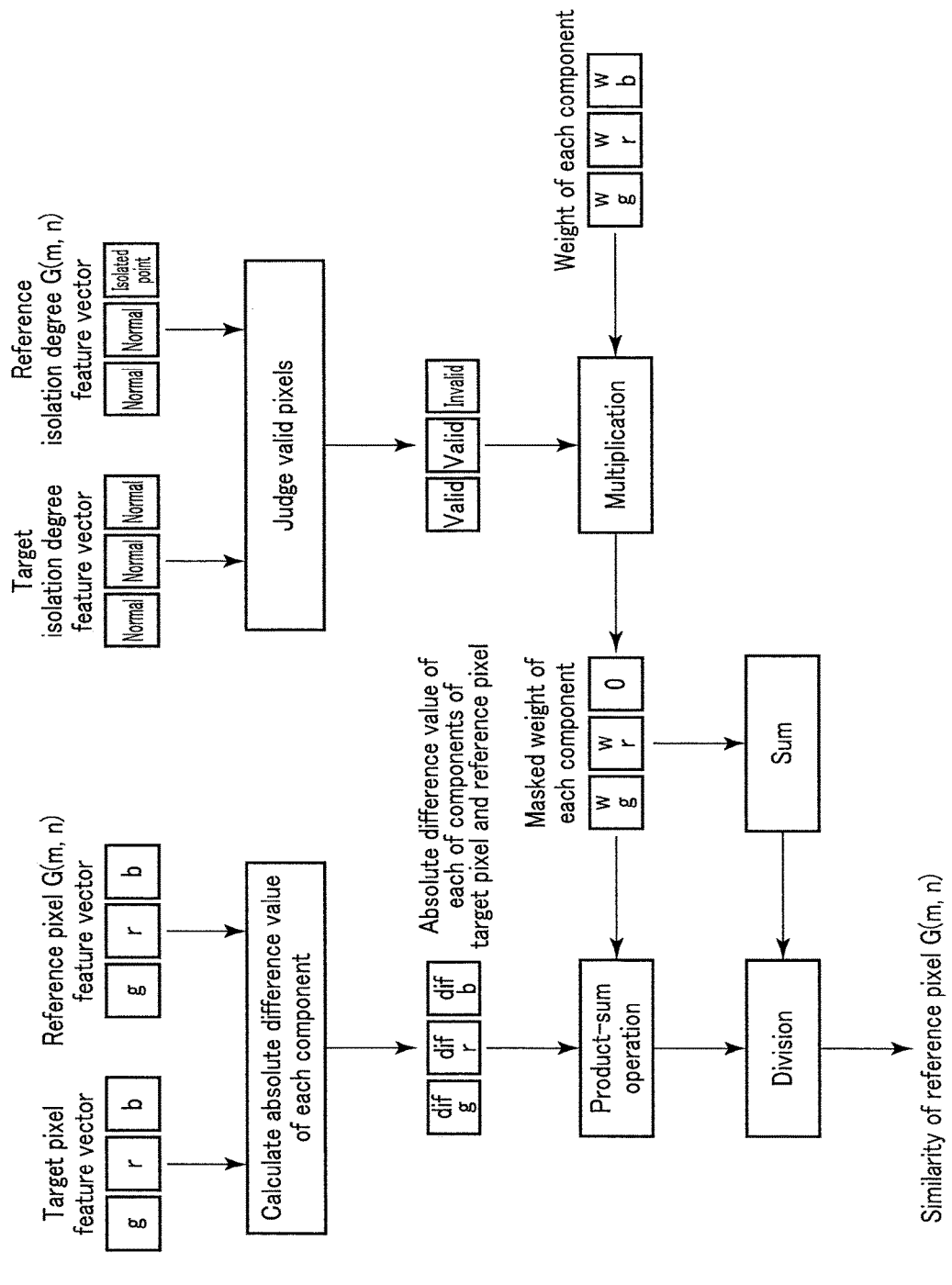
F I G. 17

IMAGE PROCESSING APPARATUS, IMAGE PROCESSING METHOD, AND NON-TRANSITORY STORAGE MEDIUM STORING IMAGE PROCESSING PROGRAM

CROSS-REFERENCE TO RELATED APPLICATIONS

This application is a Continuation application of PCT Application No. PCT/JP2014/066467, filed Jun. 20, 2014 and based upon and claiming the benefit of priority from the prior Japanese Patent Application No. 2013-133099, filed Jun. 25, 2013, the entire contents of both of which are incorporated herein by reference.

BACKGROUND OF THE INVENTION

1. Field of the Invention

The present invention relates to an image processing apparatus, an image processing method, and a non-transitory storage medium storing an image processing program for detecting and correcting pixels to be corrected such as defective pixels and pixels of impulse noise from an image.

2. Description of the Related Art

As a technique for detecting pixels to be corrected such as defective pixels and pixels of impulse noise from an input image, there has been known, for example, a method according to Roman Garnett, Timothy Huegerich, Charles Chui, Fellow, IEEE, and Wenjie He, Member, IEEE, "A Universal Noise Removal Algorithm with an Impulse Detector". This literature suggests a method of calculating, as isolation degrees, total of four values having low absolute difference values among absolute difference values between a target pixel and an average value of its neighboring pixels or absolute difference values between a target pixel and its neighboring pixels.

BRIEF SUMMARY OF THE INVENTION

An image processing apparatus according to a first aspect of the invention comprises: a similarity calculation unit which calculates a similarity between a pixel value of a target pixel and a pixel value of a reference pixel located in a vicinity of the target pixel and a similarity between the pixel value of the target pixel and an average value of pixel values of reference pixels located in the vicinity of the target pixel, in an input image; a weighting factor calculation unit which calculates weighting factor respectively for the pixel value of the reference pixel and the average value of the pixel values of the reference pixels having such a similarity that a ratio or a difference regarding a multiplication result of multiplying a highest similarity among the calculated similarities by a coefficient equal to or more than a first predetermined threshold is equal to or more than a second predetermined threshold, the weighting factor being higher when the ratio is lower or the difference is smaller; a weighted average value calculation unit which calculates a weighted average value of the pixel value of the reference pixel and a weighted average value of the average value of the pixel values of the reference pixels by use of the calculated weighting factor; a subtraction unit which calculates a difference value between the pixel value of the target pixel and the weighted average value of the pixel value of the reference pixel and a difference value between the pixel value of the target pixel and the weighted average value of the average value of the pixel values of the reference pixels; an isolation degree calculation unit which calculates an isolation degree to judge whether the target pixel is a pixel to be corrected on the basis of the calculated difference value; and a correction unit which corrects the target pixel on the basis of the calculated isolation degree.

An image processing apparatus according to a second aspect of the invention comprises: a vector generation unit which generates a target pixel feature vector having, as a component, a pixel value of a pixel included in a target pixel peripheral region which is a region including pixels on a periphery of a target pixel in an input image, and compares, pixel by pixel, color information included in the target pixel peripheral region with color information included in a reference pixel peripheral region which is a region including pixels on a periphery of a reference pixel located in the vicinity of the target pixel, when the color information included in the target pixel peripheral region is totally equal to the color information included in the reference pixel peripheral region, the vector generation unit generating a reference pixel feature vector having, as a component, a pixel value included in the reference pixel peripheral region, when there is a pixel in which the color information included in the target pixel peripheral region is different from the color information included in the reference pixel peripheral region, the vector generation unit generates a reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region; a similarity calculation unit which calculates a similarity between the generated target pixel feature vector and the reference pixel feature vector; a weighting factor calculation unit which calculates a weighting factor for the pixel value of the reference pixel having such a similarity that a ratio or a difference regarding a multiplication result of multiplying a highest similarity among the calculated similarities by a coefficient equal to or more than a first predetermined threshold is equal to or more than a second predetermined threshold whereby the weighting factor is higher when the ratio is lower or the difference is smaller; a weighted average value calculation unit which calculates a weighted average value of the pixel value of the reference pixel and a weighted average value of the average value of the pixel values of the reference pixels by use of the weighting factor; a subtraction unit which calculates a difference value between the pixel value of the target pixel and the weighted average value of the pixel value of the reference pixel and a difference value between the pixel value of the target pixel and the weighted average value of the average value of the pixel values of the reference pixels; an isolation degree calculation unit which calculates an isolation degree to judge whether the target pixel is a pixel to be corrected on the basis of the calculated difference value; and a correction unit which corrects the target pixel on the basis of the calculated isolation degree.

An image processing apparatus according to a third aspect of the invention comprises: a detection unit which detects an isolation degree of each pixel in an input image; a vector generation unit which generates a target pixel feature vector having, as a component, a pixel value of a target pixel peripheral region which is a region including pixels on a periphery of a target pixel in the input image, generates a target isolation degree feature vector having, as a component, an isolation degree included in the target pixel peripheral region for the isolation degree of the target pixel, and compares, pixel by pixel, color information included in the target pixel peripheral region with color information included in a reference pixel peripheral region which is a region including pixels on a periphery of a reference pixel located in the vicinity of the target pixel, when the color information included in the target pixel peripheral region is totally equal to the color information included in the reference pixel peripheral region, the vector generation unit generating a reference pixel feature vector having, as a component, a pixel value included in the reference pixel peripheral region and a reference isolation degree feature vector having, as a component, an isolation degree included in the reference pixel peripheral region, and when there is a pixel in which the color information included in the target pixel peripheral region is different from the color information included in the reference pixel peripheral region, the vector generation unit generating a reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region, and a reference isolation degree feature vector having, as a component, an isolation degree in which the isolation degree of the pixel included in the reference pixel peripheral region and having color information different from color information of the target pixel peripheral region is replaced with an isolation degree calculated by use of an isolation degree of a pixel which is a pixel located on the periphery of a pixel included in the reference pixel peripheral region and having color information different from color information of the target pixel peripheral region and which has color information equal to color information of the target pixel peripheral region; a similarity calculation unit which calculates a similarity between the target pixel feature vector and the reference pixel feature vector by use of the target isolation degree feature vector and the reference isolation degree feature vector; a weighting factor calculation unit which calculates a weighting factor of the reference pixel on the basis of the calculated similarity and the detected isolation degree; a weighted average value calculation unit which calculates, as a correction value, a weighted average value of the reference pixels by use of the calculated weighting factor; and a mixing unit which mixes a pixel value of the target pixel with the correction value on the basis of the detected isolation degree.

An image processing method according to a fourth aspect of the invention comprises: calculating a similarity between a pixel value of a target pixel and a pixel value of a reference pixel located in a vicinity of the target pixel and a similarity between the pixel value of the target pixel and an average value of pixel values of reference pixels located in the vicinity of the target pixel, in an input image; calculating weighting factor respectively for the pixel value of the reference pixel and the average value of the pixel values of the reference pixels having such a similarity that a ratio or a difference regarding a multiplication result of multiplying a highest similarity among the calculated similarities by a coefficient equal to or more than a first predetermined threshold is equal to or more than a second predetermined threshold, the weighting factor being higher when the ratio is lower or the difference is smaller; calculating a weighted average value of the pixel value of the reference pixel and a weighted average value of the average value of the pixel values of the reference pixels by use of the calculated weighting factor; calculating a difference value between the pixel value of the target pixel and the weighted average value of the pixel value of the reference pixel and a difference value between the pixel value of the target pixel and the weighted average value of the average value of the pixel values of the reference pixels; calculating an isolation degree to judge whether the target pixel is a pixel to be corrected on the basis of the calculated difference value; and correcting the target pixel on the basis of the calculated isolation degree.

An image processing method according to a fifth aspect of the invention comprises: generating a target pixel feature vector having, as a component, a pixel value of a pixel included in a target pixel peripheral region which is a region including pixels on a periphery of a target pixel in an input image, and comparing, pixel by pixel, color information included in the target pixel peripheral region with color information included in a reference pixel peripheral region which is a region including pixels on a periphery of a reference pixel located in the vicinity of the target pixel, when the color information included in the target pixel peripheral region is totally equal to the color information included in the reference pixel peripheral region, generating a reference pixel feature vector having, as a component, a pixel value included in the reference pixel peripheral region, and when there is a pixel in which the color information included in the target pixel peripheral region is different from the color information included in the reference pixel peripheral region, generating a reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region; calculating a similarity between the generated target pixel feature vector and the reference pixel feature vector; calculating a weighting factor for the pixel value of the reference pixel having such a similarity that a ratio or a difference regarding a multiplication result of multiplying a highest similarity among the calculated similarities by a coefficient equal to or more than a first predetermined threshold is equal to or more than a second predetermined threshold whereby the weighting factor is higher when the ratio is lower or the difference is smaller; calculating a weighted average value of the pixel value of the reference pixel and a weighted average value of the average value of the pixel values of the reference pixels by use of the weighting factor; calculating a difference value between the pixel value of the target pixel and the weighted average value of the pixel value of the reference pixel and a difference value between the pixel value of the target pixel and the weighted average value of the average value of the pixel values of the reference pixels; calculating an isolation degree to judge whether the target pixel is a pixel to be corrected on the basis of the calculated difference value; and correcting the target pixel on the basis of the calculated isolation degree.

An image processing method according to a sixth aspect of the invention comprises: detecting an isolation degree of each pixel in an input image; generating a target pixel feature vector having, as a component, a pixel value of a target pixel peripheral region which is a region including pixels on the periphery of a target pixel in the input image, generating a target isolation degree feature vector having, as a component, an isolation degree included in the target pixel peripheral region for the isolation degree of the target pixel, and comparing, pixel by pixel, color information included in the target pixel peripheral region with color information included in a reference pixel peripheral region which is a region including pixels on the periphery of a reference pixel located in the vicinity of the target pixel, when the color information included in the target pixel peripheral region is totally equal to the color information included in the reference pixel peripheral region, generating a reference pixel feature vector having, as a component, a pixel value included in the reference pixel peripheral region and a reference isolation degree feature vector having, as a component, an isolation degree included in the reference pixel peripheral region, and when there is a pixel in which the color information included in the target pixel peripheral region is different from the color information included in the reference pixel peripheral region, generating a reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region, and a reference isolation degree feature vector having, as a component, an isolation degree in which the isolation degree of the pixel included in the reference pixel peripheral region and having color information different from color information of the target pixel peripheral region is replaced with an isolation degree calculated by use of an isolation degree of a pixel which is a pixel located on the periphery of a pixel included in the reference pixel peripheral region and having color information different from color information of the target pixel peripheral region and which has color information equal to color information of the target pixel peripheral region; calculating a similarity between the target pixel feature vector and the reference pixel feature vector by use of the target isolation degree feature vector and the reference isolation degree feature vector; calculating a weighting factor of the reference pixel on the basis of the calculated similarity and the detected isolation degree; calculating, as a correction value, a weighted average value of the reference pixels by use of the calculated weighting factor; and mixing a pixel value of the target pixel with the correction value on the basis of the detected isolation degree.

A non-transitory storage medium according to a seventh aspect of the invention stores an image processing program which causes a computer to: calculate a similarity between a pixel value of a target pixel and a pixel value of a reference pixel located in a vicinity of the target pixel and a similarity between the pixel value of the target pixel and an average value of pixel values of reference pixels located in the vicinity of the target pixel, in an input image; calculate weighting factor respectively for the pixel value of the reference pixel and the average value of the pixel values of the reference pixels having such a similarity that a ratio or a difference regarding a multiplication result of multiplying a highest similarity among the calculated similarities by a coefficient equal to or more than a first predetermined threshold is equal to or more than a second predetermined threshold, the weighting factor being higher when the ratio is lower or the difference is smaller; calculate a weighted average value of the pixel value of the reference pixel and a weighted average value of the average value of the pixel values of the reference pixels by use of the calculated weighting factor; calculate a difference value between the pixel value of the target pixel and the weighted average value of the pixel value of the reference pixel and a difference value between the pixel value of the target pixel and the weighted average value of the average value of the pixel values of the reference pixels; calculate an isolation degree to judge whether the target pixel is a pixel to be corrected on the basis of the calculated difference value; and correct the target pixel on the basis of the calculated isolation degree.

A non-transitory storage medium according to a seventh aspect of the invention stores an image processing program which causes a computer to: generate a target pixel feature vector having, as a component, a pixel value of a pixel included in a target pixel peripheral region which is a region including pixels on a periphery of a target pixel in an input image, and compare, pixel by pixel, color information included in the target pixel peripheral region with color information included in a reference pixel peripheral region which is a region including pixels on a periphery of a reference pixel located in the vicinity of the target pixel, when the color information included in the target pixel peripheral region is totally equal to the color information included in the reference pixel peripheral region, generate a reference pixel feature vector having, as a component, a pixel value included in the reference pixel peripheral region, and when there is a pixel in which the color information included in the target pixel peripheral region is different from the color information included in the reference pixel peripheral region, generate a reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region; calculate a similarity between the generated target pixel feature vector and the reference pixel feature vector; calculate a weighting factor for the pixel value of the reference pixel having such a similarity that a ratio or a difference regarding a multiplication result of multiplying a highest similarity among the calculated similarities by a coefficient equal to or more than a first predetermined threshold is equal to or more than a second predetermined threshold whereby the weighting factor is higher when the ratio is lower or the difference is smaller; calculate a weighted average value of the pixel value of the reference pixel and a weighted average value of the average value of the pixel values of the reference pixels by use of the weighting factor; calculate a difference value between the pixel value of the target pixel and the weighted average value of the pixel value of the reference pixel and a difference value between the pixel value of the target pixel and the weighted average value of the average value of the pixel values of the reference pixels; calculate an isolation degree to judge whether the target pixel is a pixel to be corrected on the basis of the calculated difference value; and correct the target pixel on the basis of the calculated isolation degree.

A non-transitory storage medium according to a ninth aspect of the invention stores an image processing program which causes a computer to: detect an isolation degree of each pixel in an input image; generate a target pixel feature vector having, as a component, a pixel value of a target pixel peripheral region which is a region including pixels on a periphery of a target pixel in the input image, generate a target isolation degree feature vector having, as a component, an isolation degree included in the target pixel peripheral region for the isolation degree of the target pixel, and compare, pixel by pixel, color information included in the target pixel peripheral region with color information included in a reference pixel peripheral region which is a region including pixels on a periphery of a reference pixel located in the vicinity of the target pixel, when the color information included in the target pixel peripheral region is totally equal to the color information included in the reference pixel peripheral region, generate a reference pixel feature vector having, as a component, a pixel value included in the reference pixel peripheral region and a reference isolation degree feature vector having, as a component, an isolation degree included in the reference pixel peripheral region, and when there is a pixel in which the color information included in the target pixel peripheral region is different from the color information included in the reference pixel peripheral region, generate a reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region, and a reference isolation degree feature vector having, as a component, an isolation degree in which the isolation degree of the pixel included in the reference pixel peripheral region and having color information different from color information of the target pixel peripheral region is replaced with an isolation degree calculated by use of an isolation degree of a pixel which is a pixel located on the periphery of a pixel included in the reference pixel peripheral region and having color information different from color information of the target pixel peripheral region and which has color information equal to color information of the target pixel peripheral region; calculate a similarity between the target pixel feature vector and the reference pixel feature vector by use of the target isolation degree feature vector and the reference isolation degree feature vector; calculate a weighting factor of the reference pixel on the basis of the calculated similarity and the detected isolation degree; calculate, as a correction value, a weighted average value of the reference pixels by use of the calculated weighting factor; and mixing a pixel value of the target pixel with the correction value on the basis of the detected isolation degree.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5A is a first diagram showing a second selection example of reference pixels;

FIG. 5B is a second diagram showing the second selection example of reference pixels;

FIG. 10 is a diagram showing a first example of a generation method of a reference pixel feature vector;

FIG. 16A is a first diagram showing a generation method of generating feature vectors having one component for each piece of R, G, B color information from regions of 3×3 pixels around a target pixel and a reference pixel;

FIG. 17 is a diagram showing a calculation example of the calculation of a weighting factor from a similarity according to the third embodiment of the present invention.

DETAILED DESCRIPTION OF THE INVENTION

Hereinafter, embodiments of the present invention will be described with reference to the drawings.

Figure 1:
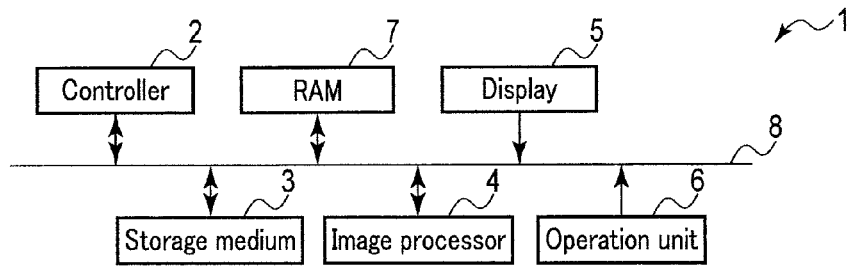
FIG. 1 is a diagram showing a configuration example of an information processing apparatus including an image processing apparatus according to each embodiment of the present invention.

FIG. 1 is a diagram showing a configuration example of an information processing apparatus including an image processing apparatus according to each embodiment of the present invention. An information processing apparatus 1 shown in FIG. 1 is, for example, a personal computer (PC). However, the information processing apparatus 1 does not always need to be a PC, and may include various types of information processing apparatuses having information processing functions. For example, the information processing apparatus 1 may be a digital camera.

The information processing apparatus 1 includes a controller 2, storage medium 3, an image processor 4, a display 5, an operation unit 6, a RAM 7, and a bus 8. The controller 2 is, for example, a CPU, and controls various operations of the information processing apparatus 1 in accordance with programs stored in the storage medium 3. The storage medium is, for example, a hard disk, and stores various data such as the programs necessary for the operations of the information processing apparatus 1 and input images which are images to be processed by the image processor 4. The image processor 4 as the information processing apparatus according to each embodiment of the present invention subjects an input image read from the storage medium 3 and then expanded in the RAM 7 to image processing. The display 5 displays the input image. The operation unit 6 is, for example, a keyboard or a mouse, and is an operational component necessary for a user to perform the various operations of the information processing apparatus 1. The RAM 7 temporarily stores various data generated inside the information processing apparatus 1. The bus 8 is a transfer channel to transfer the various data generated inside the information processing apparatus 1.

(First Embodiment)
(Configuration)

Figure 2:
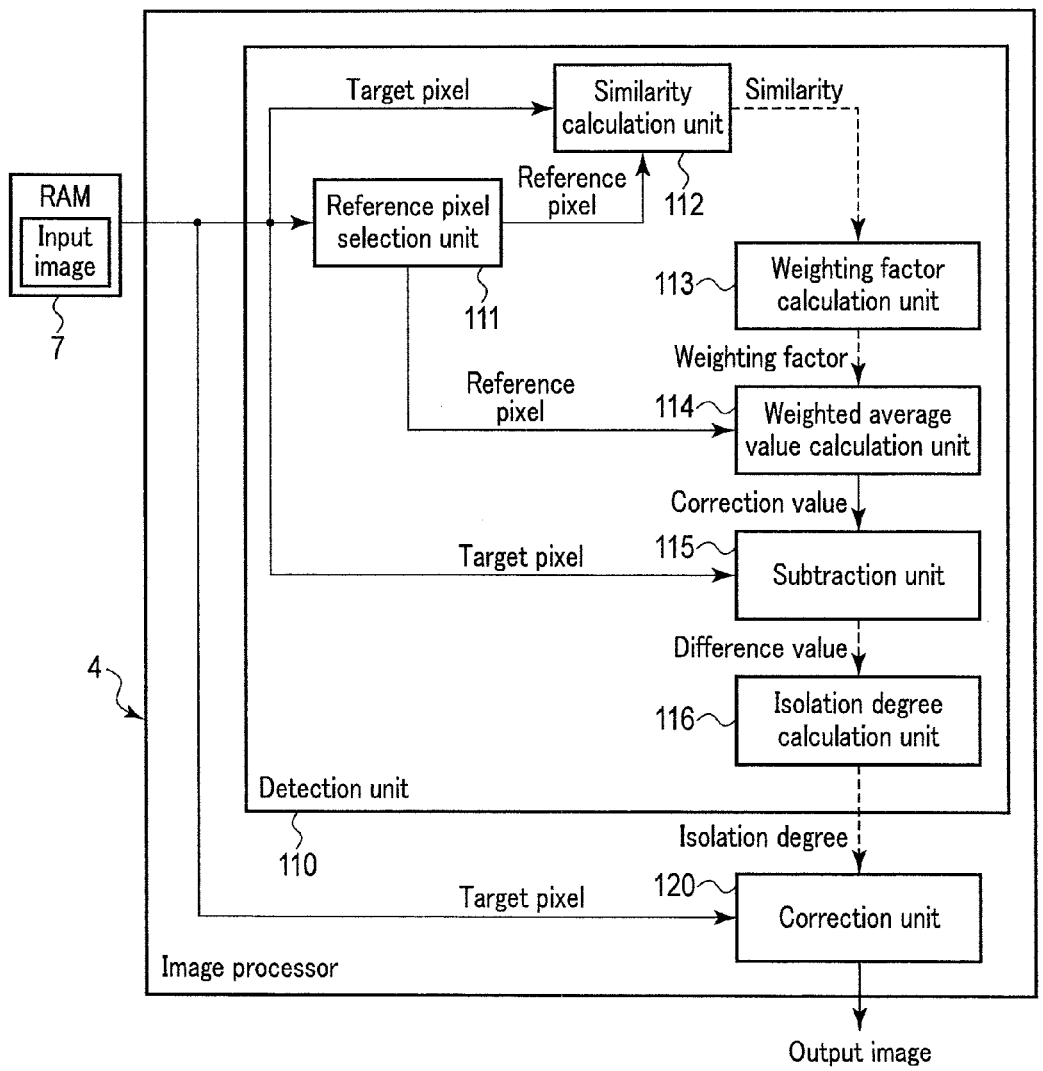
FIG. 2 is a block diagram showing a configuration example of an image processor as the image processing apparatus according to the first embodiment of the present invention.

The first embodiment of the present invention is described below. FIG. 2 is a block diagram showing a configuration example of the image processor 4 as the image processing apparatus according to the first embodiment of the present invention. Solid-line arrows in FIG. 2 indicate the flow of image data. Dotted-line arrows in FIG. 2 indicate the flow of control data. As shown in FIG. 2, the image processor 4 includes a detection unit 110 and a correction unit 120. The function of each block of the image processor 4 may be achieved by hardware, or may be achieved by software, or may be achieved by a combination of the two.

The detection unit 110 includes a reference pixel selection unit 111, a similarity calculation unit 112, a weighting factor calculation unit 113, a weighted average value calculation unit 114, a subtraction unit 115, and an isolation degree calculation unit 116. The detection unit 110 calculates an isolation degree to detect an isolated point which is a pixel to be corrected in the input image. The reference pixel selection unit 111 is connected to the similarity calculation unit 112 and the weighted average value calculation unit 114, selects a pixel value of a reference pixel in the input image stored in the similarity calculation unit 112 and the RAM 7, and inputs the selected pixel value of the reference pixel to the similarity calculation unit 112 and the weighted average value calculation unit 114. The similarity calculation unit 112 is connected to the reference pixel selection unit 111 and the weighting factor calculation unit 113, calculates a similarity between a target pixel and the reference pixel, and inputs the calculated similarity to the weighting factor calculation unit 113. The weighting factor calculation unit 113 is connected to the similarity calculation unit 112 and the weighted average value calculation unit 114, calculates a weighting factor corresponding to each reference pixel in accordance with the similarity calculated in the similarity calculation unit 112, and inputs the calculated weighting factor to the weighted average value calculation unit 114. The weighted average value calculation unit 114 is connected to the reference pixel selection unit 111, the weighting factor calculation unit 113, and the subtraction unit 115, calculates, as a correction value for the target pixel, a weighted average value of the pixel value of the reference pixel selected in the reference pixel selection unit 111 on the basis of the output of the reference pixel selection unit 111 and the output of the weighting factor calculation unit 113, and inputs the calculated correction value to the subtraction unit 115 and the correction unit 120. The subtraction unit 115 is connected to the weighted average value calculation unit 114 and the isolation degree calculation unit 116, calculates a difference value between the pixel value of the target pixel and the correction value, and inputs the calculated difference value to the isolation degree calculation unit 116. The isolation degree calculation unit 116 is connected to the subtraction unit 115 and the correction unit 120, calculates an isolation degree of the target pixel on the basis of the difference value calculated in the subtraction unit 115, and inputs the calculated isolation degree to the correction unit 120.

The correction unit 120 is connected to the isolation degree calculation unit 116, and corrects, by the isolation degree calculated in the isolation degree calculation unit 116, the pixel value of the target pixel using the correction value calculated as in the weighted average value calculation unit 114 as required.

(Operation)

Figure 3:
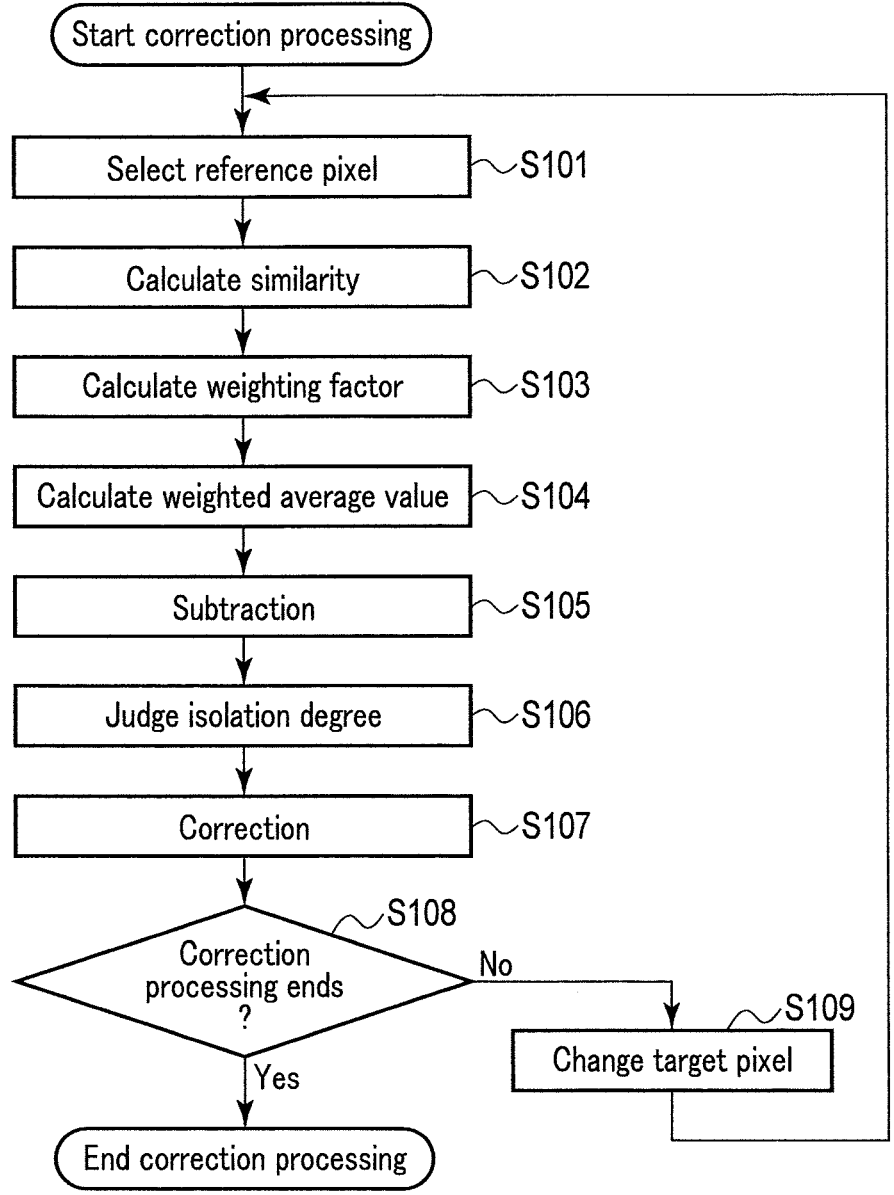
FIG. 3 is a flowchart showing the operation of image processing by the image processor according to the first embodiment of the present invention.

Next, the operation of the image processor 4 according to the present embodiment is described. FIG. 3 is a flowchart showing the operation of image processing by the image processor 4 according to the present embodiment. In the example shown in FIG. 3, a defective pixel correction is only performed as the image processing. Actually, various types of image processing other than the defective pixel correction may be performed.

In step S101, the reference pixel selection unit 111 selects a target pixel P in the input image stored in the RAM 7, and selects a reference pixel Qi in the input image in accordance with the position (coordinates) of the selected target pixel P. The target pixel P is a pixel targeted for correction processing. The target pixel P at the time of the initial selection is, for example, the pixel at the upper left end in the input image. At and after the second selection, the position of the target pixel P is sequentially changed by the processing in step S107.

FIG. 4A, FIG. 4B, FIG. 5A, and FIG. 5B show selection examples of the reference pixels Qi (i=0, 1, 2, 3, ..., N−1). The reference pixel selection unit 111 selects the reference pixels Qi at the positions shown in FIG. 4A and FIG. 4B, or FIG. 5A and FIG. 5B on the basis of the position of the target pixel P. In the examples of FIG. 4A, FIG. 4B, FIG. 5A, and FIG. 5B, the color arrangement of the input image is a primary color Bayer arrangement. The color arrangement of the input image does not need to be the color based Bayer arrangement.

Figure 4A:
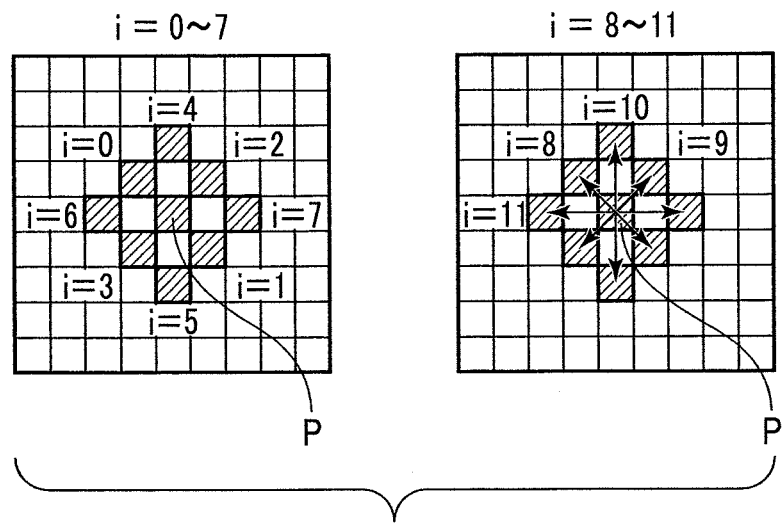
FIG. 4A is a first diagram showing a first selection example of reference pixels.
Figure 4B:
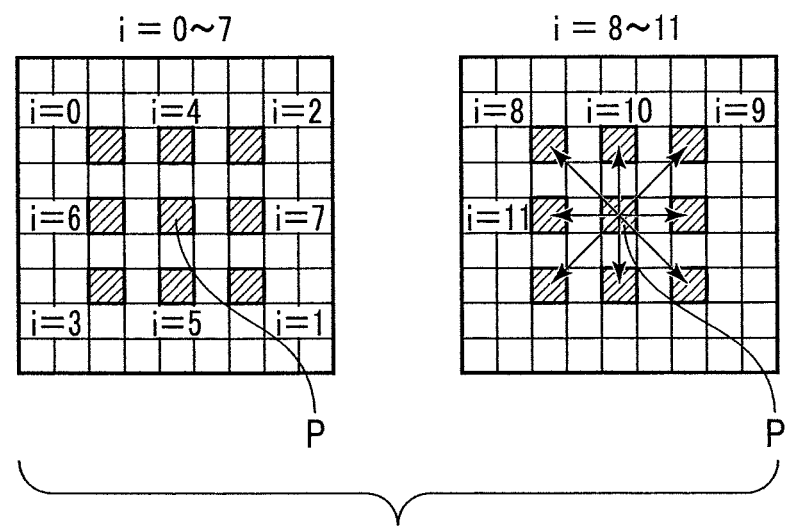
FIG. 4B is a second diagram showing the first selection example of reference pixels.

In the examples shown in FIG. 4A and FIG. 43, the pixels of the same color (i=0 to 7) located in the vicinity of the target pixel P and the average (i=8 to 11) of two pixels of the same color located in the vicinity of the target pixel P are the reference pixels Qi. The pixels of the same color located in the vicinity are, for example, the closest pixels located at the positions in the horizontal, vertical, and oblique directions around a certain target pixel P. The average of two pixels of the same color located in the vicinity of the target pixel P are the average of pixels located in point symmetry with respect to the target pixel P among the pixels of the same color located in the vicinity of the target pixel P. FIG. 4A shows the reference pixels Qi regarding the G pixel. FIG. 4B shows the reference pixels Qi regarding the B pixel and the R pixel.

In the examples shown in FIG. 5A and FIG. 5B, the pixels of the same color (i=0 to 7) located in the vicinity of the target pixel P, the average (i=8 to 11) of two pixels of the same color located in the vicinity of the target pixel P, and the average (i=12 to 15) of three pixels of the same color located in the vicinity of the target pixel P are the reference pixels Qi. The average of three pixels of the same color located in the vicinity of the target pixel P are the average of pixels located at the upper left, upper right, lower left, or lower right pixel and two pixels lying across each pixel among the pixels of the same color located in the vicinity of the target pixel P. FIG. 5A shows the reference pixels Qi regarding the G pixel. FIG. 5B shows the reference pixels Qi regarding the B pixel and the R pixel.

In step S102, the similarity calculation unit 112 calculates a similarity difi between the target pixel P and the reference pixel Qi. The similarity difi is an absolute difference value between a pixel value a of the target pixel P and a pixel value bi of the reference pixel Qi, as shown in (Equation 1).

$$difi = |a - bi| \quad \text{(Equation 1)}$$

N similarities difi (i=0 to N−1) are obtained by the calculation of (Equation 1). In the example shown according to the present embodiment, a similarity is calculated for each pixel. Otherwise, the sum of the similarities of the pixels (sum of absolute differences) may be the similarity.

Figure 6:
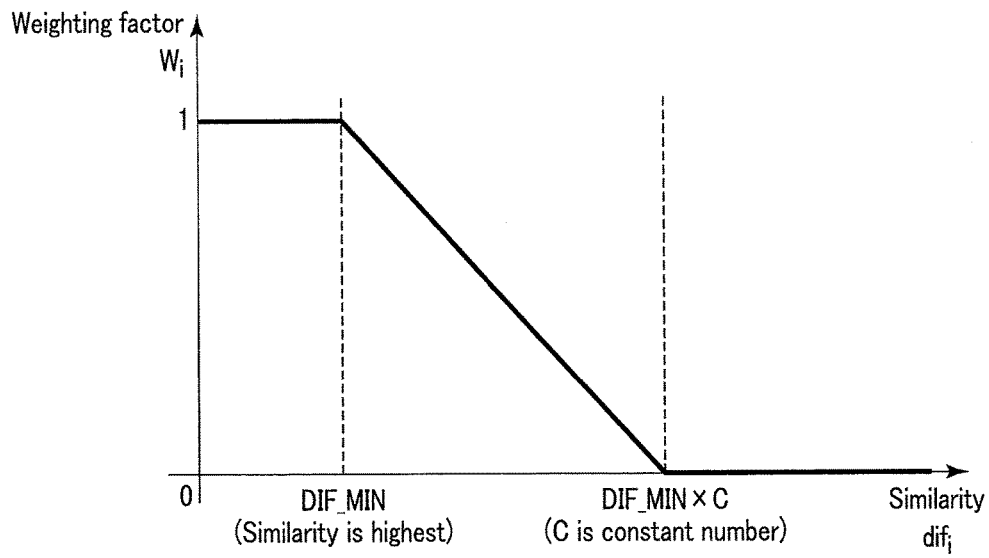
FIG. 6 is a graph showing a calculation example of the calculation of a weighting factor from a similarity according to the first embodiment of the present invention.

In step S103, the weighting factor calculation unit 113 calculates a weighting factor Wi for each of the reference pixels Qi from the similarity difi of each of the reference pixels Qi input from the similarity calculation unit 112. FIG. 6 shows a calculation example of the calculation of the weighting factor Ni from the similarity difi. The weighting factor Ni for each of the reference pixels Qi is calculated in accordance with the ratio between the similarity difi to the reference pixel Qi and a minimum value DIF_MIN of the similarity difi. The weighting factor Ni has values from 0 to 1, and when the ratio between DIF_MIN and the similarity difi to the reference pixel Qi is less than or equal to a constant number C (e.g. C is 1 or more) as a second predetermined threshold, the reference pixel Qi is considered as a valid reference pixel, and a nonzero weighting factor is allocated thereto. In contrast, when the ratio between DIE_MIN and the similarity difi to the reference pixel Qi is more than the constant number C, the reference pixel Qi is considered as an invalid reference pixel, and a weighting factor 0 is allocated thereto. (Equation 2) below shows a calculation equation of the weighting factor Wi.

$$w_i = \begin{cases} 1 & (dif_i \leq \text{DIF\_MIN}) \\ \dfrac{\text{DIF\_MIN} \times C - dif_i}{\text{DIF\_MIN} \times C - \text{DIF\_MIN}} & (\text{DIF\_MIN} < dif_i < \text{MIN} \times C) \\ 0 & (\text{DIF\_MIN} \times C \leq dif_i) \end{cases} \quad \text{(Equation 2)}$$

The distribution of the similarity difi of the reference pixel Qi varies depending on the tendency of the pixel value in the peripheral region of the target pixel P. Therefore, when the weighting factor Wi is calculated by a simple comparison between the similarity difi and a predetermined threshold, the number of the reference pixels Qi to which the nonzero valid weighting factor Wi is allocated varies. This causes the deterioration of image quality after correction, for example, blurring of edges and formation of steps. In contrast, according to the present embodiment, the weighting factor Wi is allocated on the basis of the minimum value, that is, the highest similarity DIF_MIN among the similarities difi calculated for the reference pixels Qi. Therefore, the weighting factor Wi can be stably allocated in accordance with the status of the pixel value in the peripheral region of the target pixel P.

Here, the following methods are used in addition to the method shown in (Equation 2) as methods of allocating the weighting factor Wi: a method which uniformly allocates the same weighting factor when the ratio between DIF_MIN and the similarity difi is less than or equal to the constant number C; and a method which allocates the weighting factor not in accordance with the ratio between DIF_MIN and the similarity difi but in accordance with the difference. That is, the weighting factor has only to be allocated in descending order of similarities on the basis of DIF_MIN.

In step S104, the weighted average value calculation unit 114 calculates a weighted average value by the weighting factor Wi regarding the pixel value bi of the reference pixel Qi as a correction value bave as shown in (Equation 3) below:

$$b_{ave} = \dfrac{\sum_i (W_i \times b_i)}{\sum_i W_i}. \quad \text{(Equation 3)}$$

In step S105, the subtraction unit 115 calculates a difference value isodif between the pixel value a of the target pixel P and the correction value bave input from the weighted average value calculation unit 114 as shown in (Equation. 4) below:

$$isodif = a - bave \quad \text{(Equation 4)}$$

Figure 7:
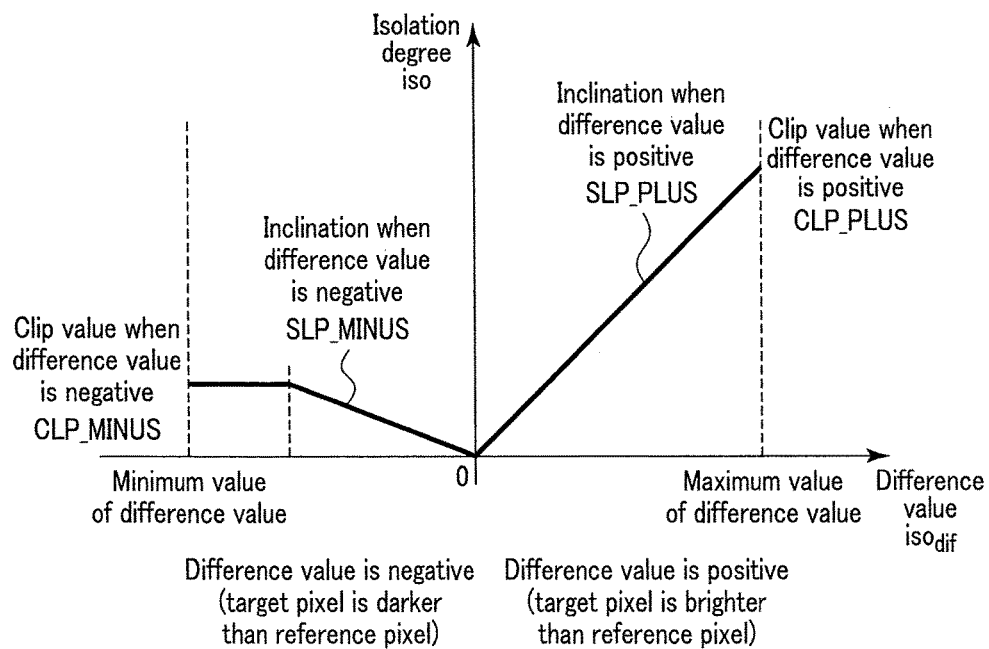
FIG. 7 is a graph showing an example of an isolation degree calculation method.

In step S106, the isolation degree calculation unit 116 modifies the difference value isodif input from the subtraction unit 115 and thereby calculates an isolation degree iso for judging the pixel to be corrected in the input image. FIG. 7 shows an example of an isolation degree calculation method. In the example shown in FIG. 7, a positive gain value SLP_PLUS and a negative gain value SLP_MINUS for the difference value isodif, and a positive clip value CLP_PLUS and a negative clip value CLP_MINUS are preset. Here, |SLP_PLUS|>|SLP_MINUS| and |CLP_PLUS|>|CLP_MINUS|. The isolation degree iso is calculated as shown in (Equation 5) below:

$$iso = \begin{cases} \text{MIN}(iso_{dif} \times \text{SLP\_PLUS}, \\ \qquad \text{CLP\_PLUS}) & (iso_{dif} \geq 0) \\ \text{MIN}(|iso_{dif}| \times \text{SLP\_MINUS}, \\ \qquad \text{CLP\_MINUS}) & (\text{others}) \end{cases} \quad \text{(Equation 5)}$$

As shown in (Equation 5), the isolation degree iso is calculated in accordance with whether the difference value isodif is positive or negative, and the isolation degree iso dependent on the tendency of the brightness and darkness of the target pixel and the reference pixels located in its vicinity can be thereby calculated.

In step S107, the correction unit 120 corrects the pixel value a of the target pixel P read from the RAM 7 as required from the isolation degree iso calculated in the isolation degree calculation unit 116. The correction unit 120 compares the isolation degree iso with a predetermined threshold. When the isolation degree iso is less than or equal to the threshold, the correction unit 120 judges that there is no need for correction, and outputs the pixel value of the target pixel P as it is. The threshold is determined as a threshold which is likely to judge an isolated point. The isolated point is a pixel to be corrected, such as a defective pixel on an image pickup device which takes input images (e.g. a white spot pixel whose output is saturated regardless of the brightness of a subject), or a pixel of impulse noise. In contrast, the correction unit 120 judges that there is a need for correction when the isolation degree iso is more than the threshold. The correction is made, for example, by replacing the pixel value of the target pixel P with the correction value calculated as in the weighted average value calculation unit 114.

As described above, according to the present embodiment, it is possible to stably allocate the weighting factor in accordance with the status of the pixel value in the peripheral region of the target pixel by allocating the weighting factor based on the highest similarity among the similarities calculated for the respective reference pixels to each of the reference pixels.

Furthermore, it is possible to suppress a wrong calculation of an isolation degree such as judgment of edges, gradations, and corner patterns included in the input image as isolated points, by also treating, as a reference pixel, an average value based on reference pixels in addition to the reference pixels of the same color located in the vicinity of the target pixel.

Moreover, it is possible to calculate an isolation degree while recognizing the tendency of the brightness and darkness of the target pixel and the reference pixels located in its vicinity by calculating an isolation degree on the basis of the result of the subtraction of the target pixel and the weighted average value of the reference pixel. In the present embodiment, the difference value isodif is modified into the isolation degree iso. In contrast, the difference value isodif may be the isolation degree iso as it is.

[Second Embodiment]
[Configuration]

Figure 8:
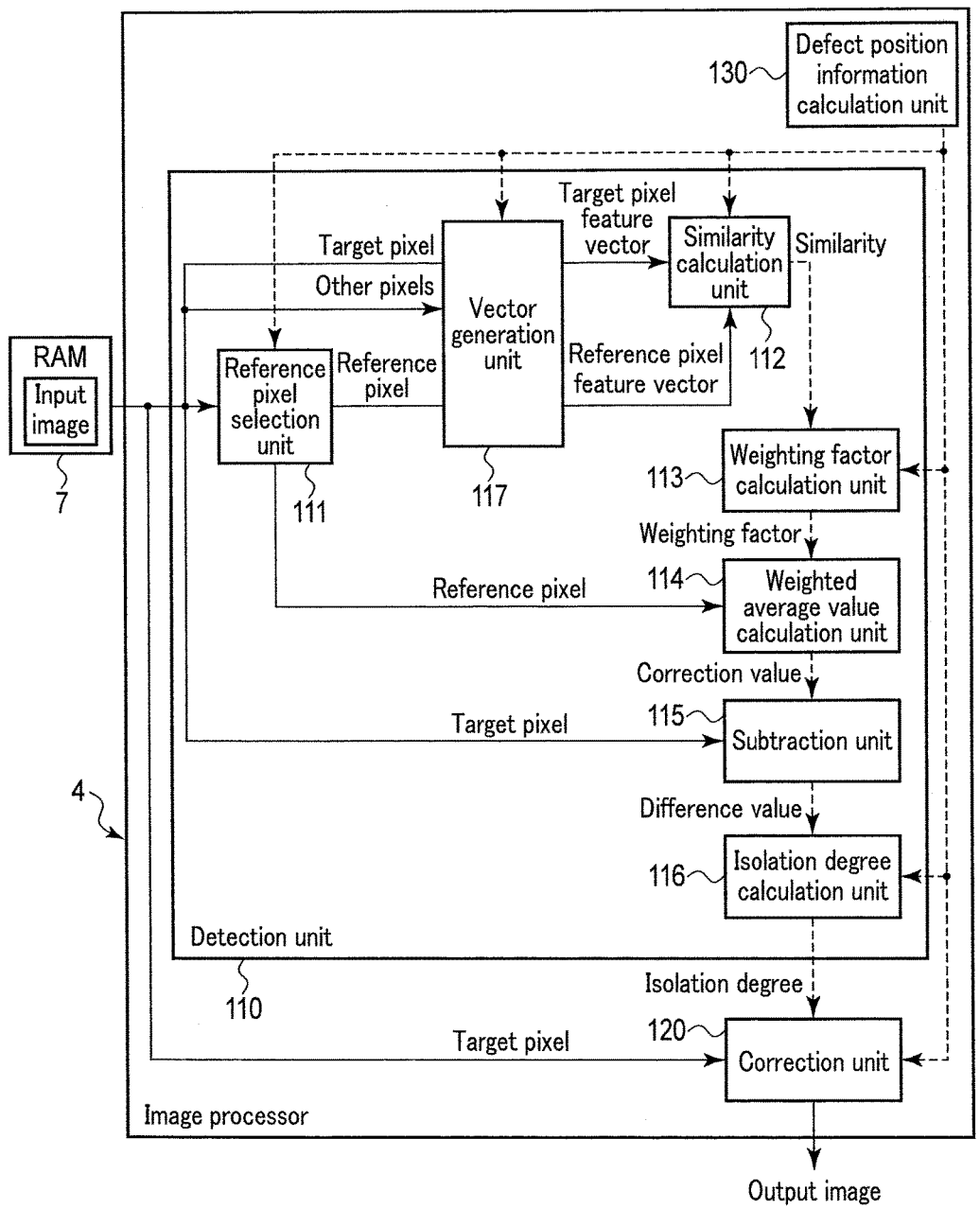
FIG. 8 is a block diagram showing a configuration example of the image processor as the image processing apparatus according to the second embodiment of the present invention.

FIG. 8 is a block diagram showing a configuration example the image processor 4 as the image processing apparatus according to the second embodiment of the present invention. Parts in FIG. 8 that are different from those in FIG. 2 are not described. In FIG. 8, a vector generation unit 117 is provided between the reference pixel selection unit 111 and the similarity calculation unit 112. The vector generation unit 117 generates a feature vector representing the feature of the target pixel P (hereinafter referred to as a target pixel feature vector) and a feature vector representing the feature of the reference pixel Qi (hereinafter referred to as a reference pixel feature vector). In FIG. 8, a defect position information calculation unit 130 is provided. The defect position information calculation unit 130 is, for example, a ROM, and stores positional information for defective pixels.

(Operation)

Next, the operation of the image processor 4 according to the present embodiment is described. Here, parts different from those in the first embodiment are mainly described. That is, the operation of the vector generation unit 117 is primarily described. After a reference pixel is selected in step S101 in FIG. 3, the vector generation unit 117 generates a target pixel feature vector and a reference pixel feature vector. Generation examples of the target pixel feature vector and the reference pixel feature vector are described below with reference to FIG. 9, FIG. 10, and FIG. 11. Here, in the examples of FIG. 9 to FIG. 11, a feature vector having a pixel value of 3×3 pixels around the target pixel P or the reference pixel Qi is generated.

Figure 9:
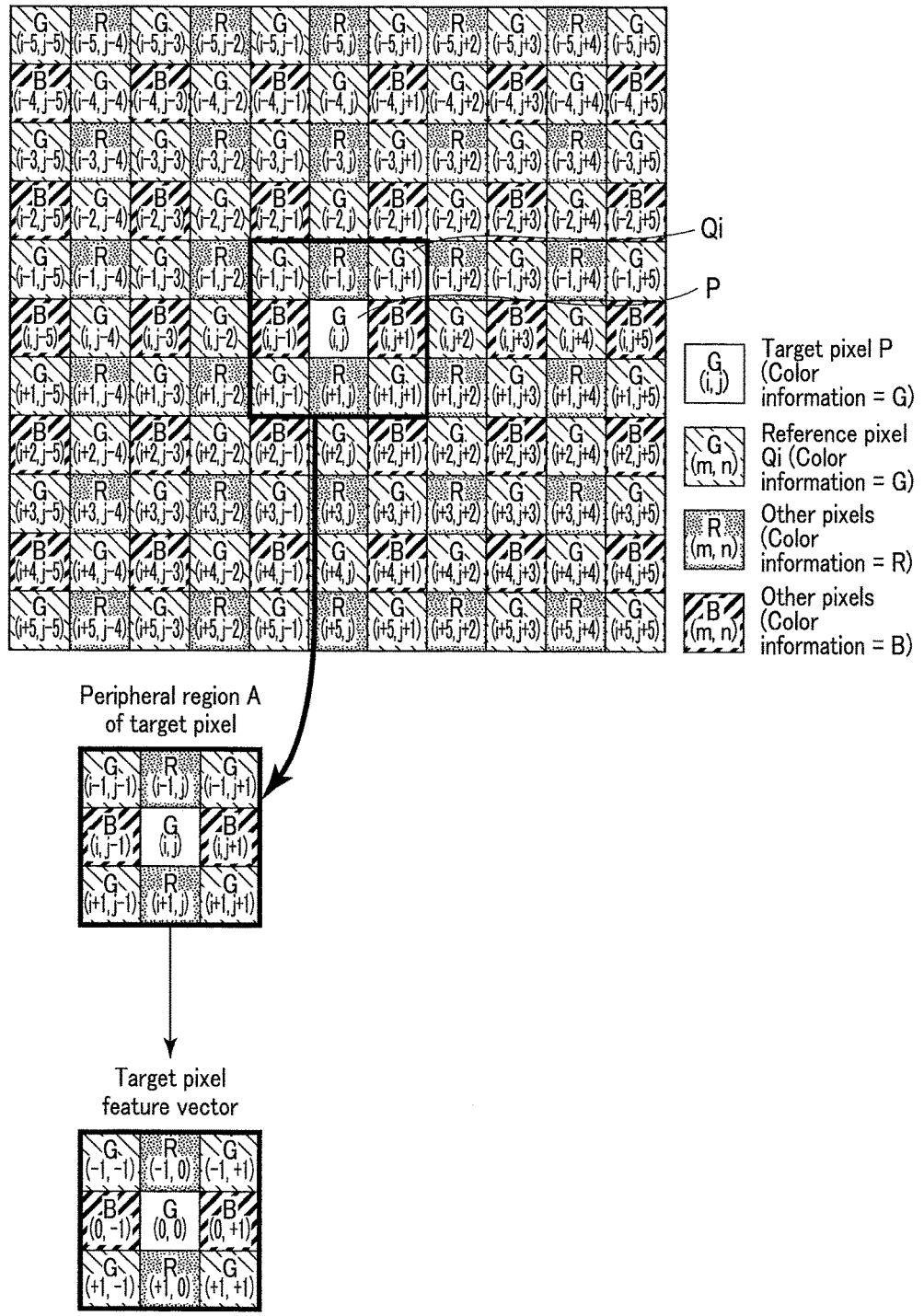
FIG. 9 is a diagram showing an example of a generation method of a target pixel feature vector.

The generation of the target pixel feature vector is described. FIG. 9 is a diagram showing an example of a generation method of the target pixel feature vector. The vector generation unit 117 reads a pixel value of a region of 3×3 pixels around the target pixel P indicated by a thick frame in FIG. 9, and generates a target pixel feature vector having each pixel value as a component. If the position of the target pixel P is a reference position (0, 0), the pixel value of a target pixel peripheral region A for the target pixel P is represented as $a_{m,n}(-1 \leq m \leq 1, -1 \leq n \leq 1)$. Therefore, a component $a'_{m,n}(-1 \leq m \leq 1, -1 \leq n \leq 1)$ of the target pixel feature vector is calculated in accordance with (Equation 6) below:

$$a'_{m,n} = a_{m,n}$$

$(-1 \leq m \leq 1, -1 \leq n \leq 1)$ \hfill (Equation 6)

Figure 11:
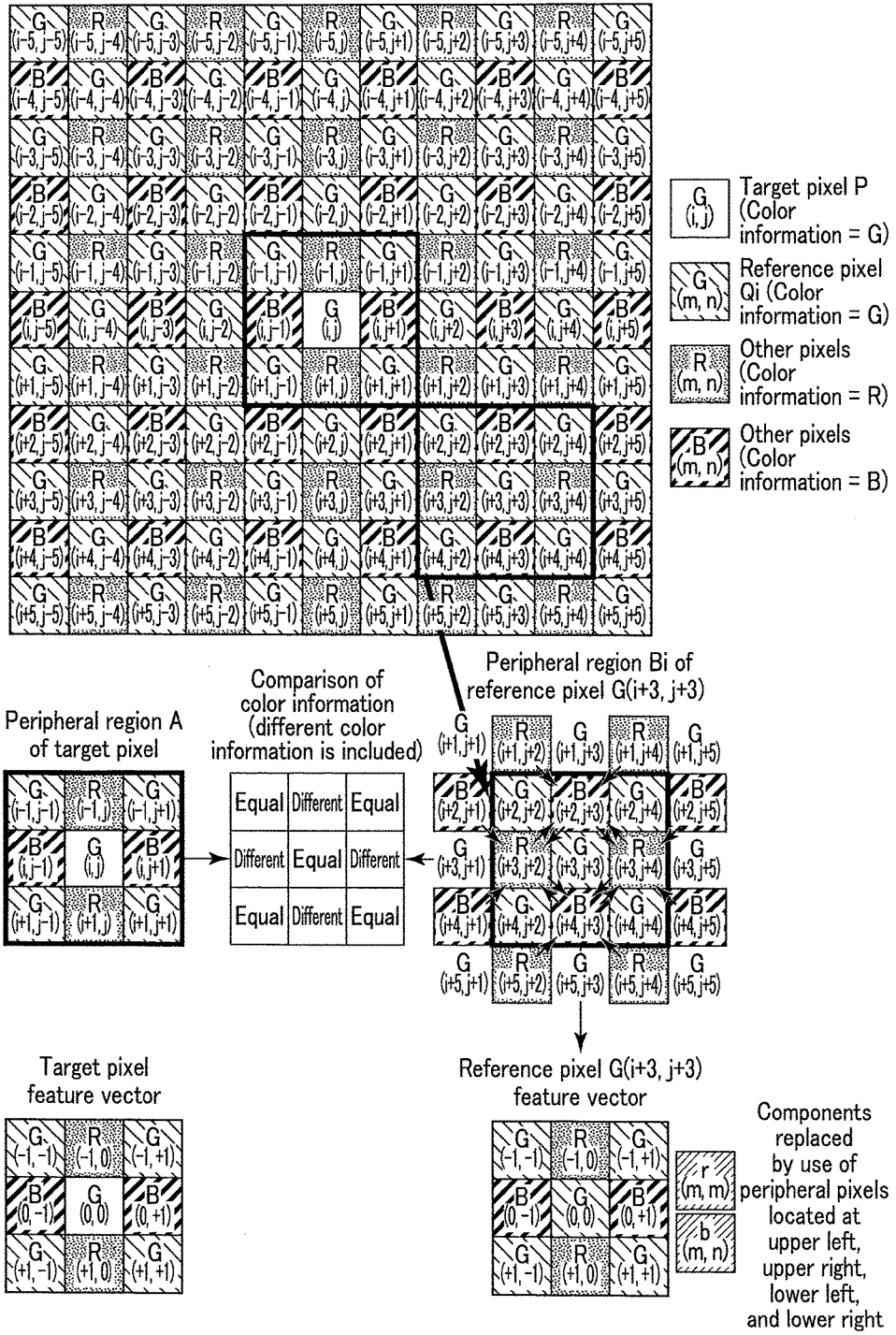
FIG. 11 is a diagram showing a second example of the generation method of the reference pixel feature vector.

The generation of the reference pixel feature vector is described. FIG. 10 and FIG. 11 are diagrams showing examples of the generation method of the reference pixel feature vector. The vector generation unit 117 reads the pixels in the region of 3×3 pixels around the reference pixel Qi for the reference pixel Qi of the same color as the target pixel P selected by the reference pixel selection unit 111, and compares, pixel by pixel, the color information (pixel value) of the pixels in the region of 3×3 pixels around the target pixel P with the color information for the region of 3×3 pixels around the reference pixel Qi. When the color information for the pixels in the region of 3×3 pixels around the target pixel P is totally equal to the color information for the pixels in the region of 3×3 pixels around the reference pixel Qi, the vector generation unit 117 generates a reference pixel feature vector having the pixel value of the region of 3×3 pixels around the reference pixel Qi as a component as shown in FIG. 10. In contrast, when there is a pixel in which the color information for the pixels in the region of 3×3 pixels around the target pixel P is different from the color information for the pixels in the region of 3×3 pixels around the reference pixel Qi, the vector generation unit 117 reads the pixels located on the periphery of the region of 3×3 pixels around the reference pixel Qi as shown in FIG. 11, and generates a reference pixel feature vector in which the pixels are replaced with the pixels located on the periphery to have components equal to the color information for the pixels in the region of 3×3 pixels around the target pixel P. For the method of generating, as a component, a pixel value having color information equal to that of the target pixel from the pixels located on the periphery of the pixels having different color information, a suitable method is selected depending on a permitted calculation amount, for example, the average value or median of the pixel value having equal color information. When a component is generated by use of the average value of the pixel value having equal color information in the example of FIG. 11, a component b'm,n ($-1 \leq m \leq 1$, $-1 \leq n \leq 1$) of the reference pixel feature vector for the reference pixel Qi is calculated in accordance with (Equation 7) below wherein the pixel value of a reference pixel peripheral region Bi for the reference pixel Qi is bm,n($-1 \leq m \leq 1$, $-1 \leq n \leq 1$):

$$b'_{m,n} = \begin{cases} b_{m,n} & \text{(Color information of } a_{m,n} \\ & \text{is equal to that of } b_{m,n}\text{)} \\ \dfrac{b_{m-1,n-1} + b_{m-1,n+1} + b_{m+1,n-1} + b_{m+1,n+1}}{4} & \text{(Color information of } a_{m,n} \\ & \text{is different from that of } b_{m,n}\text{)} \end{cases}$$

$(-1 \leq m \leq 1, -1 \leq n \leq 1).$ \hfill (Equation 7)

In this way, the reference pixel feature vector is generated so that the color information for the pixels included in the peripheral region of the target pixel P may be equal to the color information for the pixels included in the peripheral region of the reference pixel Qi, whereby the number of reference pixels Qi that can be used for the calculation of a similarity can be increased. Therefore, it is possible to more accurately calculate a similarity.

Figure 12:
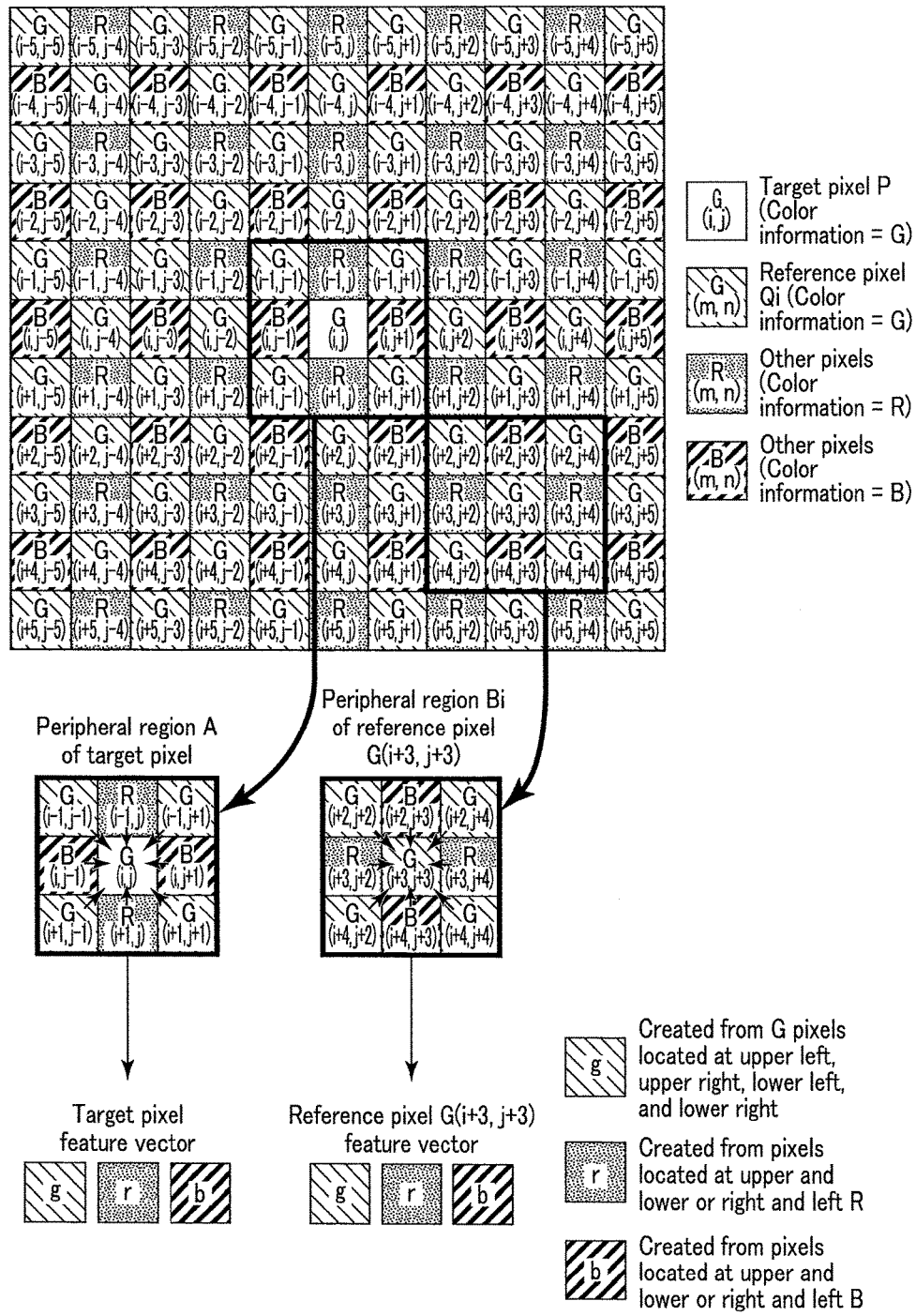
FIG. 12 is a diagram showing a first generation example of a feature vector having the number of components smaller than 3×3 components.

FIG. 9 to FIG. 11 described above show the generation examples of the feature vector having 3×3 components. In contrast, a first generation example of a feature vector having the number of components smaller than 3×3 components is shown in FIG. 12. FIG. 12 shows an example of the generation of feature vectors r, g, and b having one component for each piece of the R, G, B color information from the region of 3×3 pixels around the target pixel P and the reference pixel Qi. For the method of generating each of the components of the feature vectors, a suitable method is selected depending on a permitted calculation amount; for example, a method of generating an average value of pixel values having equal color information in the region of 3×3 pixels around the target pixel P or the reference pixel Qi, or a method of generating a median. When a component is generated by use of the average value of the pixel values having equal color information, one component a'k(k=0, 1, 2) for each piece of color information for the target pixel feature vector and one component b'k(k=0, 1, 2) for each piece of color information for the reference pixel feature vector are calculated in accordance with (Equation 8) below wherein the pixel value of the target pixel peripheral region A is am,n($-1 \leq m \leq 1$, $-1 \leq n \leq 1$) and the pixel value of the reference pixel peripheral region Bi is bm,n($-1 \leq m \leq 1$, $-1 \leq n \leq 1$):

$$a'_k = \begin{cases} \dfrac{(a_{-1,0} + a_{+1,0})}{2} & \text{(Colors corresponding to } k \\ & \text{are located upper and lower)} \\ \dfrac{(a_{0,-1} + a_{0,+1})}{2} & \text{(Colors corresponding to } k \\ & \text{are located left and right)} \\ \dfrac{(a_{-1,-1} + a_{-1,+1} + a_{+1,-1} + a_{+1,+1})}{4} & \text{(Colors corresponding to } k \\ & \text{are located upper left, upper right,} \\ & \text{lower left, and lower right)} \end{cases}$$

(Equation 8)

$$b'_k = \begin{cases} \dfrac{(b_{-1,0} + b_{+1,0})}{2} & \text{(Colors corresponding to } k \\ & \text{are located upper and lower)} \\ \dfrac{(b_{0,-1} + b_{0,+1})}{2} & \text{(Colors corresponding to } k \\ & \text{are located left and right)} \\ \dfrac{(b_{-1,-1} + b_{-1,+1} + b_{+1,-1} + b_{+1,+1})}{4} & \text{(Colors corresponding to } k \\ & \text{are located upper left, upper right,} \\ & \text{lower left, and lower right)} \end{cases}$$

$(k = 0, 1, 2).$

Figure 13:
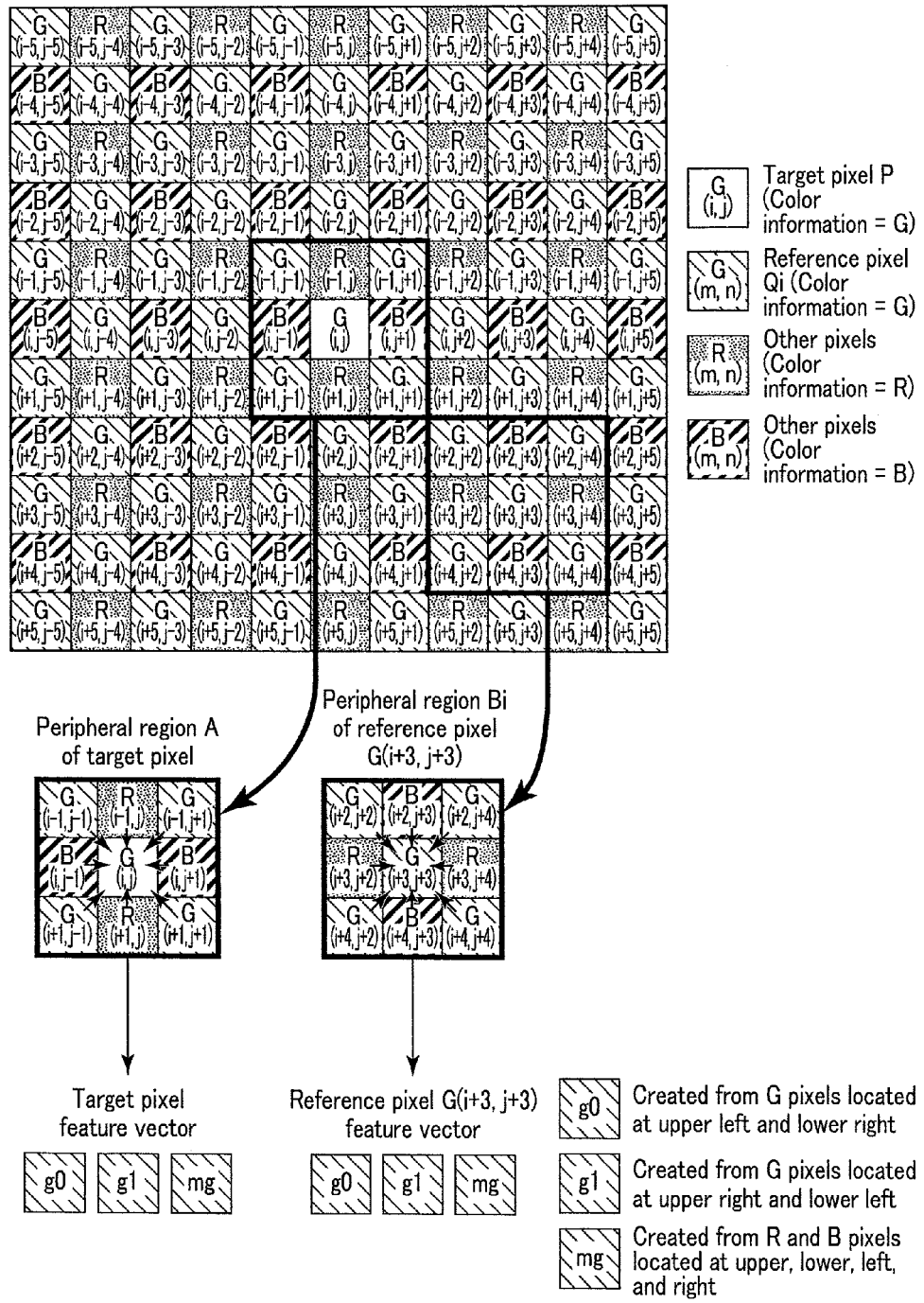
FIG. 13 is a diagram showing a second generation example of a feature vector having the number of components smaller than 3×3 components.

A second generation example of a feature vector having the number of components smaller than 3×3 components is shown in FIG. 13. FIG. 13 shows an example of the generation of feature vectors g0, g1, and mg having two components for the G color information and having one component for the R and B color information from the region of 3×3 pixels around the target pixel P and the reference pixel Qi. For the method of generating each of the components of the feature vectors, a suitable method is selected depending on a permitted calculation amount; for example, a method of generating an average value of pixel values having equal color information in the region of 3×3 pixels around the target pixel P or the reference pixel Qi, or a method of generating a median. When a component is generated by use of the average value of the pixel values having equal color information, one component a'k(k=0, 1, 2) for each piece of color information for the target pixel feature vector and one component b'k(k=0, 1, 2) for each piece of color information for the reference pixel feature vector are calculated in accordance with (Equation 9) below:

$$a'_k = \begin{cases} \dfrac{(a_{-1,-1} + a_{+1,+1})}{2} & \text{(Average of } G \text{ pixels located} \\ & \text{upper left and lower right)} \\ \dfrac{(a_{-1,+1} + a_{+1,-1})}{2} & \text{(Average of } G \text{ pixels located} \\ & \text{upper right and lower left)} \\ \dfrac{(a_{-1,0} + a_{0,-1} + a_{0,+1} + a_{+1,0})}{4} & \text{(Averages of } R \text{ pixels and } B \text{ pixels} \\ & \text{located upper lower, left,} \\ & \text{and right)} \end{cases}$$

(Equation 9)

-continued $$b'_k = \begin{cases} \dfrac{(b_{-1,-1} + b_{+1,+1})}{2} & \text{(Average of } G \text{ pixels located upper left and lower right)} \\ \dfrac{(b_{-1,+1} + b_{+1,+1})}{2} & \text{(Average of } G \text{ pixels located upper right and lower left)} \\ \dfrac{(b_{-1,0} + b_{0,-1} + b_{0,+1} + b_{+1,0})}{4} & \text{(Averages of } R \text{ pixels and } B \text{ pixels located upper lower, left, and right)} \end{cases}$$

$(k = 0, 1, 2).$

As shown in FIG. 12 and FIG. 13, it is possible to reduce the calculation amount at the time of the calculation of a similarity in the similarity calculation unit 112 by generating a feature vector having the number of components smaller than the number of pixels included in the peripheral region of the target pixel and the peripheral region of the reference pixel. As shown in FIG. 13, it is also possible to suppress the deterioration of the accuracy of a feature amount resulting from the reduction of components and reduce the calculation amount at the time of the calculation of a similarity in the similarity calculation unit 112 by generating a component that uses specific characteristics regarding the color components of the input image, for example, characteristics for the arrangement pattern of the color information or each color component.

Figure 14:
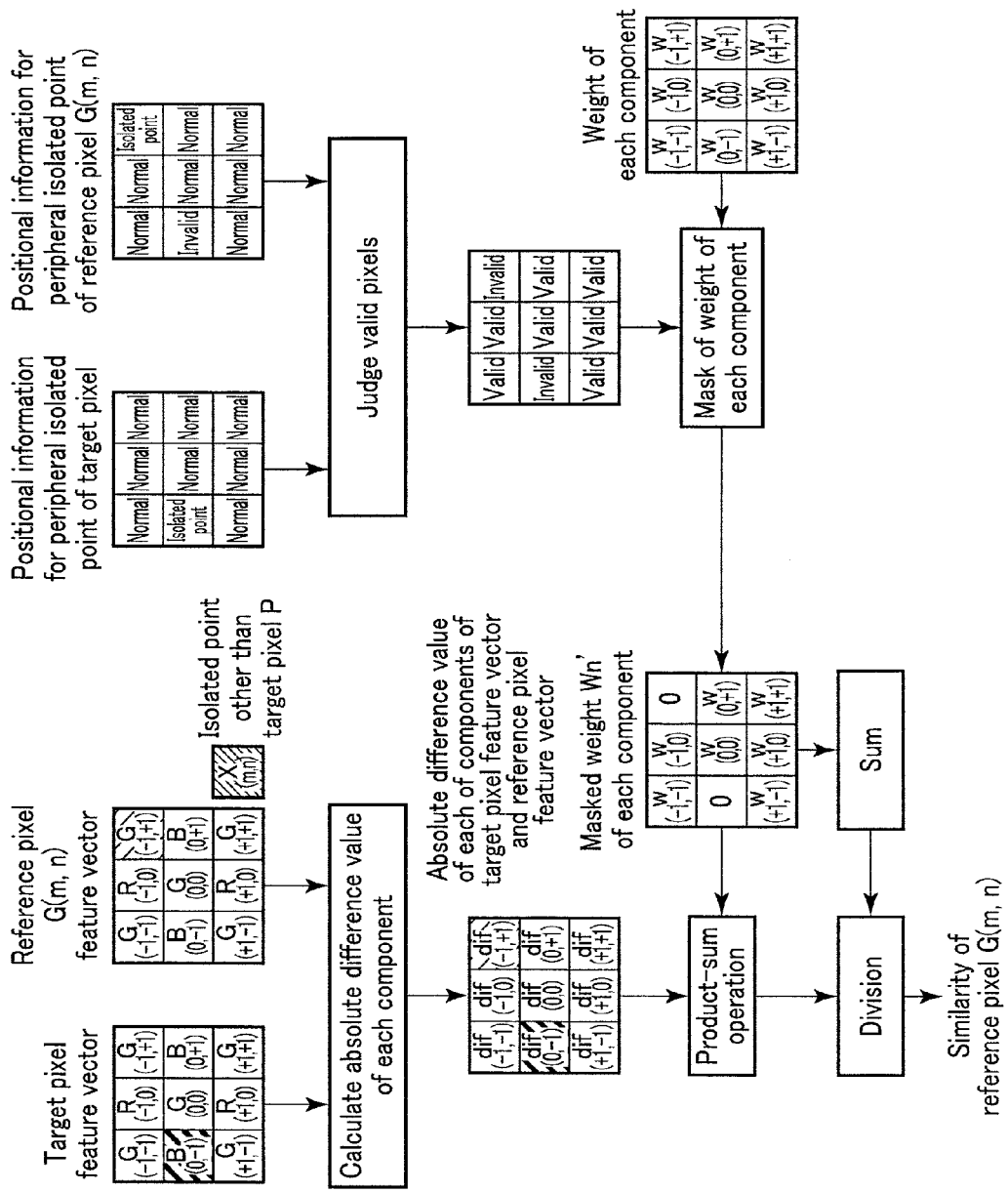
FIG. 14 is a diagram showing a calculation example of a similarity using a target pixel feature vector and a reference pixel feature vector.

The similarity calculation unit 112 according to the present embodiment finds a similarity between the target pixel feature vector and each of the reference pixel feature vectors input from the vector generation unit 117. FIG. 14 shows a calculation example of a similarity using the target pixel feature vector and the reference pixel feature vector. When an input pixel includes a great number of isolated points, there is a possibility that the components of the feature vector may have isolated points to be corrected other than the target pixel P. When the isolated points to be corrected includes isolated points whose positions are known, it is preferable to calculate a similarity by use of normal pixels alone in consideration of the presence of isolated points whose positions in the peripheral region of the target pixel P and the peripheral region of the reference pixel Qi are known. A calculation method of a similarity that accounts for the presence of such known isolated points is described below.

The similarity calculation unit 112 calculates an absolute difference value dif_abs$m,n$ between components a'$m,n$ of the target pixel feature vector and the reference pixel feature vector input from the vector generation unit 117 and reference pixel feature vectors b'$m,n$, as in (Equation 10) below:

$$dif\_abs_{m,n} = |a'_{m,n} - b'_{m,n}| \quad \text{(Equation 10)}.$$

The similarity calculation unit 112 acquires, from the defect position information calculation unit 130, information indicating the presence of known isolated points in the target pixel peripheral region and the reference pixel peripheral region. When the presence of known isolated points is determined, the similarity calculation unit 112 generates a weight Wn' in which valid pixels that are not the known isolated points alone are masked with a weight Wn of each of the predetermined components, in accordance with a discriminant shown in (Equation 11) below:

$$w'_n = \begin{cases} w_n & \text{(Component } n \text{ is normal pixel)} \\ 0 & \text{(Component } n \text{ is isolated point whose position is known)} \end{cases} \quad \text{(Equation 11)}$$

The similarity calculation unit 112 then performs a product-sum operation of the absolute difference value dif_abs$m,n$ and the weight Wn', and divides the result of the product-sum operation by the total value of the weight Wn', thereby calculating a weighted average value difi of the absolute difference value. This weighted average value difi is the similarity to the reference pixel Qi.

$$dif_i = \dfrac{\sum_n (w'_n \times dif\_abs_n)}{\sum_n w'_n}. \quad \text{(Equation 12)}$$

Here, the setting method of the weight Wn is not limited in the present embodiment. The weight Wn may be set in accordance with, for example, the distance of each of the target pixel peripheral region and the reference pixel peripheral region from its central pixel. If a similarity is calculated by use of normal pixels alone as in the present embodiment, it is possible to calculate a particularly accurate similarity when the input image includes a great number of isolated points whose positions are known. It is also possible to calculate a similarity in accordance with the generation method of the feature vectors and the characteristics of the input image by adjusting the weight Wn of each component of the feature vector depending on the presence of known isolated points.

[Third Embodiment]
[Configuration]

Figure 15:
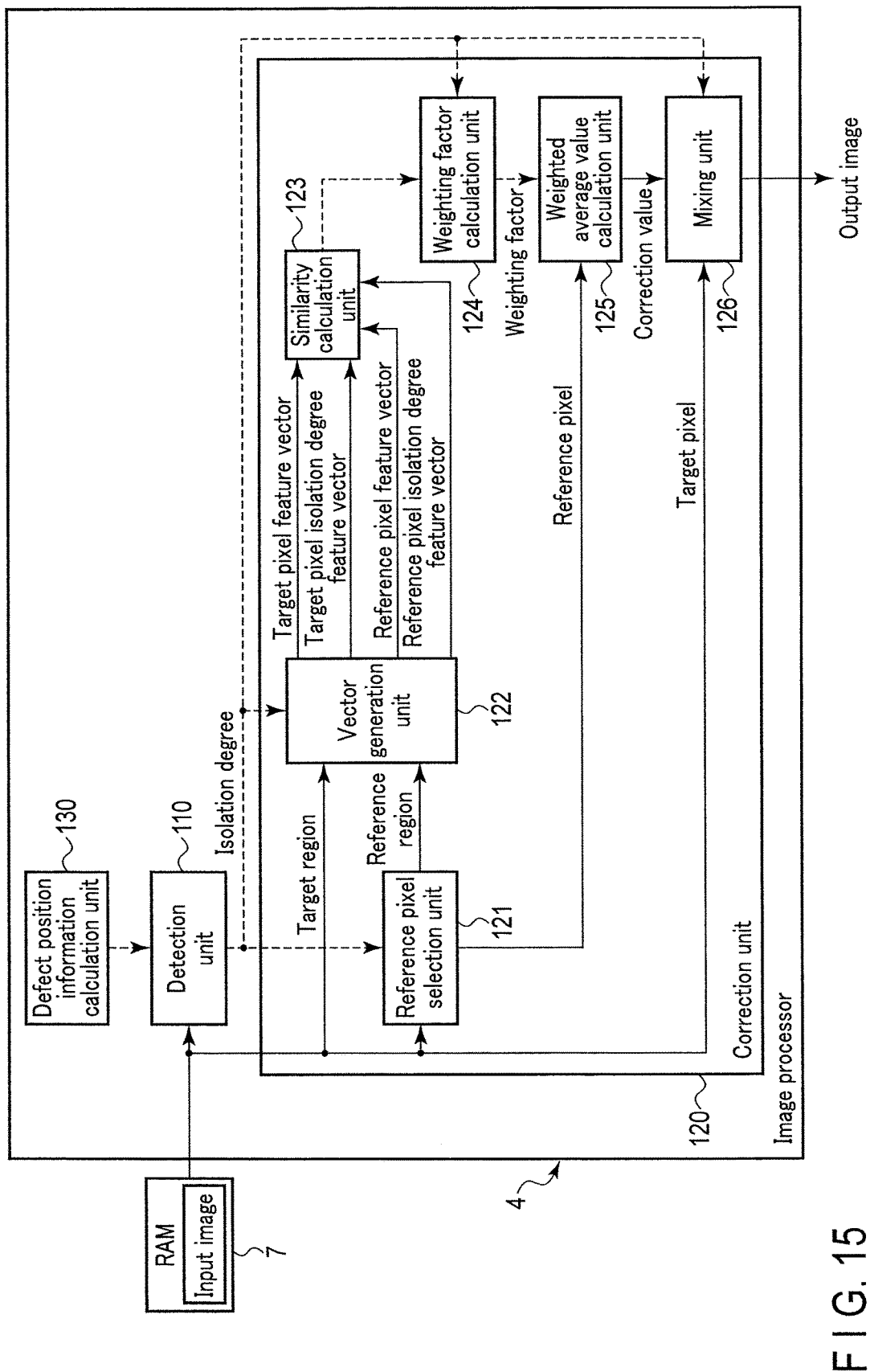
FIG. 15 is a block diagram showing a configuration example of the image processor as the image processing apparatus according to the third embodiment of the present invention.

FIG. 15 is a block diagram showing a configuration example of the image processor 4 as the image processing apparatus according to the third embodiment of the present invention. Parts in FIG. 15 that are different from those in FIG. 8 are not described. In FIG. 15, instead of the detection unit 110, the correction unit 120 includes a reference pixel selection unit 121, a vector generation unit 122, a similarity calculation unit 123, a weighting factor calculation unit 124, and a weighted average value calculation unit 125. The correction unit 120 includes a mixing unit 126 connected to the weighted average value calculation unit 125. The mixing unit 126 mixes the pixel value of the target pixel with a correction value (weighted average value) calculated in the weighted average value calculation unit 125 in accordance with the isolation degree obtained in the detection unit 110, and thereby corrects the pixel value of the target pixel.

(Operation)

Next, the operation of the image processor 4 according to the present embodiment is described. Here, parts different from those in the first and second embodiments are mainly described. In the third embodiment, the reference pixel selection unit 121 selects a pixel of the same color located in the vicinity of the target pixel P as the reference pixel Qi as in the first and second embodiments.

Figure 16B:
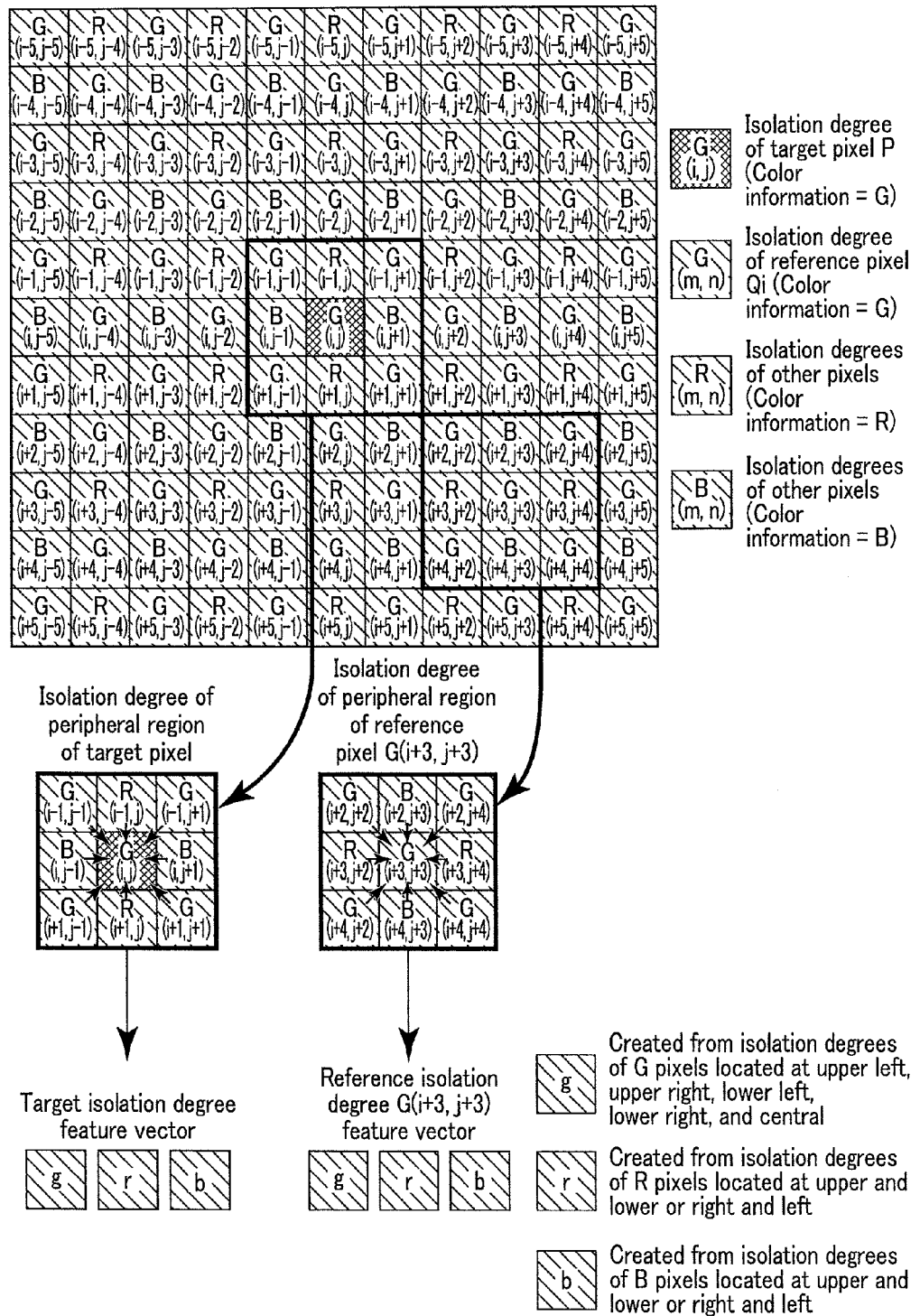
FIG. 16B is a second diagram showing a generation method of generating feature vectors having one component for each piece of the R, G, B color information from the regions of 3×3 pixels around the target pixel and the reference pixel.

The vector generation unit 122 respectively generates a target pixel feature vector representing the feature of the target pixel P, a target isolation degree feature vector representing the feature of the isolation degree of the target pixel P, a reference pixel feature vector representing the feature of the reference pixel Qi, and a reference isolation degree feature vector representing the feature of the isolation degree of the reference pixel Qi. FIG. 16A and FIG. 16B show generation methods of generating feature vectors having one component for each piece of the R, G, B color information from the regions of 3×3 pixels around the target pixel P and the reference pixel Qi. Here, FIG. 16A shows the generation examples of the target pixel feature vector and the reference pixel feature vector. FIG. 16B shows the generation examples of the target isolation degree feature vector and the reference isolation degree feature vector. For the method of generating each component, a suitable method is selected depending on a permitted calculation amount; for example, an average value or a median of pixel values having equal color information in the region of 3×3 pixels around the target pixel P or the reference pixel Qi. When a component is generated by use of the average value of the pixel values having equal color information, one component a'k(k=0, 1, 2) for each piece of color information for the target pixel feature vector and one component b'k(k=0, 1, 2) for each piece of color information for the reference pixel feature vector are calculated in accordance with (Equation 13) below:

$$a'_k = \begin{cases} \frac{(a_{-1,0} + a_{+1,0})}{2} & \text{(Colors corresponding to } k \text{ are located upper and lower)} \\ \frac{(a_{0,-1} + a_{0,+1})}{2} & \text{(Colors corresponding to } k \text{ are located left and right)} \\ \frac{(a_{-1,-1} + a_{-1,+1} + a_{+1,-1} + a_{+1,+1})}{4} & \text{(Colors corresponding to } k \text{ are located upper left, upper right, lower left, and lower right)} \end{cases} \quad \text{(Equation 13)}$$

$$b'_k = \begin{cases} \frac{(b_{-1,0} + b_{+1,0})}{2} & \text{(Colors corresponding to } k \text{ are located upper and lower)} \\ \frac{(b_{0,-1} + b_{0,+1})}{2} & \text{(Colors corresponding to } k \text{ are located left and right)} \\ \frac{(b_{-1,-1} + b_{-1,+1} + b_{+1,-1} + b_{+1,+1})}{4} & \text{(Colors corresponding to } k \text{ are located upper left, upper right, lower left, and lower right)} \end{cases}$$

$$(k = 0, 1, 2).$$

When the isolation degree of the region of 3×3 pixels around the target pixel P is a_isom,n(−1≤m≤1, −1≤n≤1) and the isolation degree of the region of 3×3 pixels around the reference pixel Qi is b_isom,n(−1≤m≤1, −1≤n≤1), one component a_iso'k(k=0, 1, 2) for each piece of color information for the target isolation degree feature vector and one component b_iso'k(k=0, 1, 2) for each piece of color information for the reference isolation degree feature vector are calculated in accordance with (Equation 14) below:

$$a\_iso'_k = \begin{cases} \frac{(a\_iso_{-1,0} + a\_iso_{+1,0})}{2} & \text{(Colors corresponding to } k \text{ are located upper and lower)} \\ \frac{(a\_iso_{0,-1} + a\_iso_{0,+1})}{2} & \text{(Colors corresponding to } k \text{ are located left and right)} \\ \frac{(a\_iso_{-1,-1} + a\_iso_{-1,+1} + a\_iso_{+1,-1} + a\_iso_{+1,+1})}{4} & \text{(Colors corresponding to } k \text{ are located upper left, upper right, lower left, and lower right)} \end{cases} \quad \text{(Equation 14)}$$

$$b\_iso'_k = \begin{cases} \frac{(b\_iso_{-1,0} + b\_iso_{+1,0})}{2} & \text{(Colors corresponding to } k \text{ are located upper and lower)} \\ \frac{(b\_iso_{0,-1} + b\_iso_{0,+1})}{2} & \text{(Colors corresponding to } k \text{ are located left and right)} \\ \frac{(b\_iso_{-1,-1} + b\_iso_{-1,+1} + b\_iso_{+1,-1} + b\_iso_{+1,+1})}{4} & \text{(Colors corresponding to } k \text{ are located upper left, upper right, lower left, and lower right)} \end{cases}$$

$$(k = 0, 1, 2).$$

The similarity calculation unit 123 finds a similarity between the target pixel feature vector and each of the reference pixel feature vectors input from the vector generation unit 122. When an input pixel includes a great number of isolated points, there is a possibility that the components of the feature vector may have isolated points to be corrected other than the target pixel. Therefore, it is preferable to calculate a similarity by use of normal components alone in consideration of the isolation degree. In the present embodiment, the absolute difference value of each component is calculated from the feature vector of the target pixel P and the feature vector of the reference pixel Qi, a weight in which components including isolated points are excluded from the target isolation degree feature vector and the reference isolation degree feature vector is calculated for the weight that is previously determined for the absolute difference value of each component, and the weighted average value of the absolute difference value that accounts for the isolation degree of each component is used as the similarity to the reference pixel.

A further explanation is given with reference to FIG. 16A and FIG. 16B. The similarity calculation unit 123 according to the present embodiment calculates an absolute difference value dif_absm,n between components a'm,n of the target pixel feature vector and the reference pixel feature vector input from the vector generation unit 117 and reference pixel feature vectors b'm,n, as in (Equation 15) below:

$$dif\_abs_{m,n} = |a'_{m,n} - b'_{m,n}| \quad \text{(Equation 15)}.$$

The similarity calculation unit 123 compares each of components a_isom,n of the target isolation degree feature vector and each of components b_isom,n of the reference isolation degree feature vector input from the vector generation unit 117 with a predetermined threshold TH1 in accordance with a discriminant shown in (Equation 16) below. The similarity calculation unit 123 then generates a weight Wn' that accounts for the isolation degree of each component by masking the weight Wn of each predetermined component when an isolation degree higher than the threshold TH1 is included.

$$w'_n = \begin{cases} 0 (a\_iso'_n > TH1 \text{ or } b\_iso'_n > TH1) \\ W_n \quad \text{others} \end{cases} \quad \text{(Equation 16)}$$

The similarity calculation unit 123 then performs a Product-sum operation of the absolute difference value dif_abs,n and the weight Wn', and divides the result of the product-sum operation by the total value of the weight Wn', thereby calculating a weighted average value difi of the absolute difference, as shown in (Equation 17) below. This weighted average value difi is the similarity to the reference pixel Qi.

$$dif_i = \frac{\sum_n (w'_n \times dif\_abs_n)}{\sum_n w'_n}. \quad \text{(Equation 17)}$$

Here, the setting method of the weight Wn is not limited in the present embodiment. The weight Wn may be set in accordance with, for example, the distance of each of the target pixel peripheral region and the reference pixel peripheral region from its central pixel. If a similarity is calculated by use of normal pixels alone on the basis of the isolation degree input from the detection unit 110 as in the present embodiment, it is possible to calculate a particularly accurate similarity when the input image includes a great number of isolated points whose positions are known. In the present embodiment as well as in the second embodiment, it is possible to calculate a similarity in accordance with the generation method of the feature vectors and the characteristics of the input image by adjusting the weight Wn of each component of the feature vector.

After the calculation of the similarity, the weighting factor calculation unit 124 calculates a weighting factor Wi for each of the reference pixels Qi from the similarity difi of each of the reference pixels Qi input from the similarity calculation unit 123 and the isolation degree iso. FIG. 17 shows a calculation example of the calculation of the weighting factor Wi from the similarity difi. The weighting factor Wi for each of the reference pixels Qi is calculated in accordance with the ratio between the similarity difi of each reference pixel Qi and a minimum value DIF_MIN of the similarity difi. The weighting factor Wi has values from 0 to 1, and when the ratio between DIF_MIN and the similarity difi to the reference pixel Qi is less than or equal to a constant number C, the reference pixel Qi is considered as a valid reference pixel, and a nonzero weighting factor is allocated thereto. In contrast, when the ratio between DIF_MIN and the similarity difi to the reference pixel Qi is more than the constant number C or when the isolation degree iso of the target pixel P is higher than a preset threshold TH2, the reference pixel Qi is considered as an invalid reference pixel, and a weighting factor 0 is allocated thereto. (Equation 18) below shows a calculation equation of the weighting factor Wi.

$$w_i = \begin{cases} 1 & (dif_i \leq \text{DIF\_MIN}) \\ \frac{\text{DIF\_MIN} \times C - dif_i}{\text{DIF\_MIN} \times C - \text{DIF\_MIN}} & (\text{DIF\_MIN} < dif_i < \text{MIN} \times C) \\ 0 & (\text{DIF\_MIN} \times C \leq dif_i) \\ & \text{or } iso > TH2 \end{cases} \quad \text{(Equation 18)}$$

After the calculation of the weighting factor Wi, the weighted average value calculation unit 125 calculates a weighted average value by the weighting factor Ni of the pixel value bi of the reference pixel Qi as a correction value bave as shown in (Equation 19) below:

$$b_{ave} = \frac{\sum_i (W_i \times b_i)}{\sum_i W_i}. \quad \text{(Equation 19)}$$

Figure 18:
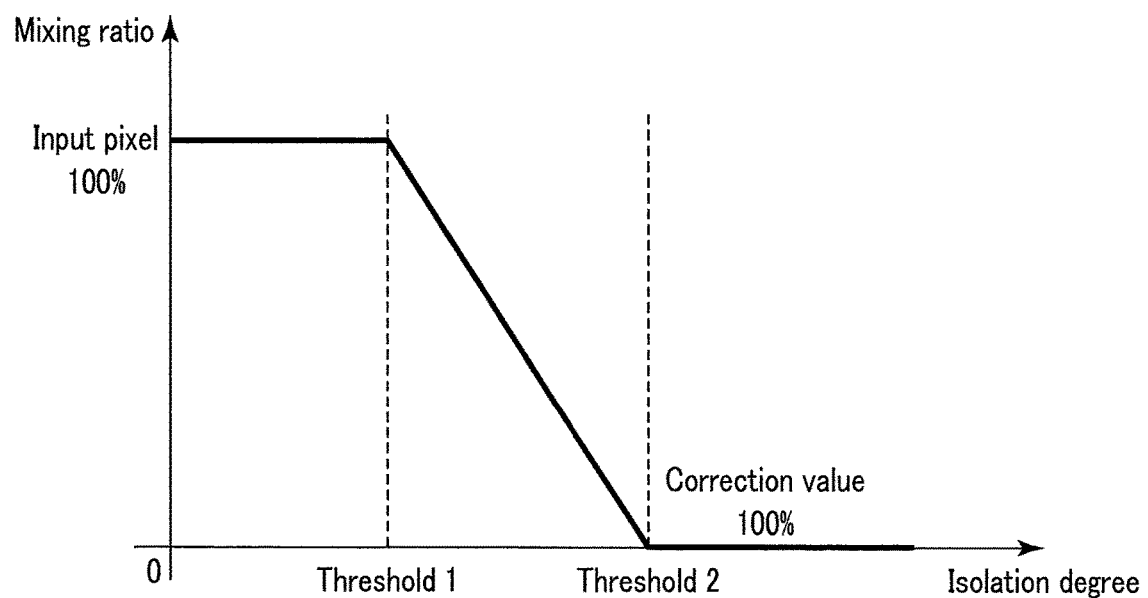
FIG. 18 is a graph showing a setting example of a mixing ratio between a target pixel and a correction value based on an isolation degree.

After the calculation of the correction value, the mixing unit 126 sets a mixing ratio between the target pixel and the correction value on the basis of an isolation degree input by the detection unit 110, and performs mixing processing by the weighted average of the target pixel and the correction value on the basis of the mixing ratio. FIG. 18 shows a setting example of a mixing ratio between the target pixel and the correction value based on the isolation degree. In the example of FIG. 18, a threshold 1 which is likely to judge a normal pixel and a threshold 2 which is likely to judge an isolated point are provided from a numerical tendency of the isolated points included in the input image and the isolation degrees of the other pixels, and a mixing ratio for an isolation degree therebetween is calculated by a linear expression. If a mixing ratio is also set to mix a correction value in the target pixel having an isolation degree lower than the threshold 1 (i.e. a normal pixel), random noise included in the input image can be reduced.

As described above, according to the present embodiment, it is possible to adjust detail keeping performance of an output image and reduce random noise included in the input image by mixing the pixel value of the target pixel and the correction value on the basis of the isolation degree input obtained in the detection unit 110.

The method of each of the processes by an imaging apparatus according to the embodiments described above, that is, the processing shown in each of the flowcharts is stored as a program that can be executed by the controller 2. This program can be stored and distributed in a storage medium of an external storage device such as a memory card (e.g. a ROM card, a RAM card), a magnetic disk (e.g. a floppy disk, a hard disk), an optical disk (e.g. a CD-ROM, a DVD), or a semiconductor memory. The controller 2 then reads the program stored in the storage medium of the external storage device, and can perform the processing described above when the operation is controlled by the read program.

What is claimed is:

1. An apparatus comprising:
a memory storing a program; and
a processor which executes the program stored in the memory to perform operations including:
calculating a similarity between a pixel value of a target pixel and a pixel value of a reference pixel located in a vicinity of the target pixel and a similarity between the pixel value of the target pixel and an average value of pixel values of reference pixels located in the vicinity of the target pixel, in an input image;

calculating a weighting factor respectively for the pixel value of the reference pixel and the average value of the pixel values of the reference pixels having such a similarity that a ratio or a difference with respect to a multiplication result of multiplying a highest similarity among the calculated similarities by a coefficient equal to or more than a first predetermined threshold is equal to or more than a second predetermined threshold, the weighting factor being higher when the ratio is lower or the difference is smaller;

calculating a weighted average value of the pixel value of the reference pixel and the average value of the pixel values of the reference pixels by use of the calculated weighting factors;

calculating a difference value between the pixel value of the target pixel and the weighted average value;

calculating an isolation degree to judge whether the target pixel is a pixel to be corrected on the basis of the calculated difference value; and correcting the target pixel on the basis of the calculated isolation degree.

2. An apparatus comprising:

a memory storing a program; and a processor which executes the program stored in the memory to perform operations including:

generating a target pixel feature vector having, as a component, a pixel value of a pixel included in a target pixel peripheral region which is a region including pixels on a periphery of a target pixel in an input image;

for each of a plurality of reference pixels, comparing, pixel by pixel, color information included in the target pixel peripheral region with color information included in a reference pixel peripheral region which is a region including pixels on a periphery of a reference pixel located in the vicinity of the target pixel, and generating (i) when the color information included in the target pixel peripheral region is totally equal to the color information included in the reference pixel peripheral region, a reference pixel feature vector having, as a component, a pixel value included in the reference pixel peripheral region, or (ii) when there is a pixel in which the color information included in the target pixel peripheral region is different from the color information included in the reference pixel peripheral region, a reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region;

calculating a similarity between the generated target pixel feature vector and each of the generated reference pixel feature vectors;

calculating a weighting factor respectively for the pixel value of each of the reference pixels having such a similarity that a ratio or a difference with respect to a multiplication result of multiplying a highest similarity among the calculated similarities by a coefficient equal to or more than a first predetermined threshold is equal to or more than a second predetermined threshold, whereby the weighting factor is higher when the ratio is lower or the difference is smaller;

calculating a weighted average value of the pixel values of the reference pixels by use of the weighting factors;

calculating a difference value between the pixel value of the target pixel and the weighted average value;

calculating an isolation degree to judge whether the target pixel is a pixel to be corrected on the basis of the calculated difference value; and correcting the target pixel on the basis of the calculated isolation degree.

3. The apparatus according to claim 1, wherein the processor modifies the isolation degree in accordance with an input pixel value or the difference value.

4. The apparatus according to claim 1, wherein the processor calculates the similarity to exclude the pixel value of a known pixel to be corrected specified by information regarding the known pixel to be corrected in the input image.

5. The apparatus according to claim 2, wherein the processor modifies the isolation degree in accordance with an input pixel value or the difference value.

6. The apparatus according to claim 2, wherein the processor calculates the similarity to exclude the pixel value of a known pixel to be corrected specified by information regarding the known pixel to be corrected in the input image.

7. An apparatus comprising:

a memory storing a program; and a processor which executes the program stored in the memory to perform operations including:

detecting an isolation degree of each pixel in an input image;

generating a target pixel feature vector having, as a component, a pixel value of a target pixel peripheral region which is a region including pixels on a periphery of a target pixel in the input image;

generating a target isolation degree feature vector having, as a component, an isolation degree included in the target pixel peripheral region for the isolation degree of the target pixel;

for each of a plurality of reference pixels, comparing, pixel by pixel, color information included in the target pixel peripheral region with color information included in a reference pixel peripheral region which is a region including pixels on a periphery of a reference pixel located in the vicinity of the target pixel, and generating (i) when the color information included in the target pixel peripheral region is totally equal to the color information included in the reference pixel peripheral region, a reference pixel feature vector having, as a component, a pixel value included in the reference pixel peripheral region and a reference isolation degree feature vector having, as a component, an isolation degree included in the reference pixel peripheral region, or (ii) when there is a pixel in which the color information included in the target pixel peripheral region is different from the color information included in the reference pixel peripheral region, reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region, and a reference isolation degree feature vector having, as a component, an isolation degree in which the isolation degree of the pixel included in the reference pixel peripheral region and having color information different from color information of the target pixel peripheral region is replaced with an isolation degree calculated by use of an isolation degree of a pixel which is a pixel located on the periphery of a pixel included in the reference pixel peripheral region and having color information different from color information of the target pixel peripheral region and which has color information equal to color information of the target pixel peripheral region;

calculating a similarity between the target pixel feature vector and each of the generated reference pixel feature vectors by use of the target isolation degree feature vector and the reference isolation degree feature vectors;

calculating a weighting factor of each of the reference pixels respectively, on the basis of the calculated similarity and the detected isolation degree;

calculating, as a correction value, a weighted average value of the reference pixels by use of the calculated weighting factors; and mixing a pixel value of the target pixel with the correction value on the basis of the detected isolation degree.

8. An image processing method comprising:

calculating a similarity between a pixel value of a target pixel and a pixel value of a reference pixel located in a vicinity of the target pixel and a similarity between the pixel value of the target pixel and an average value of pixel values of reference pixels located in the vicinity of the target pixel, in an input image;

calculating a weighting factor respectively for the pixel value of the reference pixel and the average value of the pixel values of the reference pixels having such a similarity that a ratio or a difference with respect to a multiplication result of multiplying a highest similarity among the calculated similarities by a coefficient equal to or more than a first predetermined threshold is equal to or more than a second predetermined threshold, the weighting factor being higher when the ratio is lower or the difference is smaller;

calculating a weighted average value of the pixel value of the reference pixel and the average value of the pixel values of the reference pixels by use of the calculated weighting factors;

calculating a difference value between the pixel value of the target pixel and the weighted average value;

calculating an isolation degree to judge whether the target pixel is a pixel to be corrected on the basis of the calculated difference value; and correcting the target pixel on the basis of the calculated isolation degree.

9. An image processing method comprising:

generating a target pixel feature vector having, as a component, a pixel value of a pixel included in a target pixel peripheral region which is a region including pixels on a periphery of a target pixel in an input image;

for each of a plurality of reference pixels, comparing, pixel by pixel, color information included in the target pixel peripheral region with color information included in a reference pixel peripheral region which is a region including pixels on a periphery of a reference pixel located in the vicinity of the target pixel, and generating (i) when the color information included in the target pixel peripheral region is totally equal to the color information included in the reference pixel peripheral region, a reference pixel feature vector having, as a component, a pixel value included in the reference pixel peripheral region, or (ii) when there is a pixel in which the color information included in the target pixel peripheral region is different from the color information included in the reference pixel peripheral region, a reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region;

calculating a similarity between the generated target pixel feature vector and each of the generated reference pixel feature vectors;

calculating a weighting factor respectively for the pixel value of each of the reference pixels having such a similarity that a ratio or a difference with respect to a multiplication result of multiplying a highest similarity among the calculated similarities by a coefficient equal to or more than a first predetermined threshold is equal to or more than a second predetermined threshold, whereby the weighting factor is higher when the ratio is lower or the difference is smaller;

calculating a weighted average value of the pixel values of the reference pixels by use of the weighting factors;

calculating a difference value between the pixel value of the target pixel and the weighted average value;

calculating an isolation degree to judge whether the target pixel is a pixel to be corrected on the basis of the calculated difference value; and correcting the target pixel on the basis of the calculated isolation degree.

10. An image processing method comprising:

detecting an isolation degree of each pixel in an input image;

generating a target pixel feature vector having, as a component, a pixel value of a target pixel peripheral region which is a region including pixels on the periphery of a target pixel in the input image;

generating a target isolation degree feature vector having, as a component, an isolation degree included in the target pixel peripheral region for the isolation degree of the target pixel;

for each of a plurality of reference pixels, comparing, pixel by pixel, color information included in the target pixel peripheral region with color information included in a reference pixel peripheral region which is a region including pixels on the periphery of a reference pixel located in the vicinity of the target pixel, and generating (i) when the color information included in the target pixel peripheral region is totally equal to the color information included in the reference pixel peripheral region, a reference pixel feature vector having, as a component, a pixel value included in the reference pixel peripheral region and a reference isolation degree feature vector having, as a component, an isolation degree included in the reference pixel peripheral region, or (ii) when there is a pixel in which the color information included in the target pixel peripheral region is different from the color information included in the reference pixel peripheral region, a reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region, and a reference isolation degree feature vector having, as a component, an isolation degree in which the isolation degree of the pixel included in the reference pixel peripheral region and having color information different from color information of the target pixel peripheral region is replaced with an isolation degree calculated by use of an isolation degree of a pixel which is a pixel located on the periphery of a pixel included in the reference pixel peripheral region and having color information different from color information of the target pixel peripheral region and which has color information equal to color information of the target pixel peripheral region;

calculating a similarity between the target pixel feature vector and each of the generated reference pixel feature vectors by use of the target isolation degree feature vector and the reference isolation degree feature vectors;

calculating a weighting factor of each of the reference pixels respectively, on the basis of the calculated similarity and the detected isolation degree;

calculating, as a correction value, a weighted average value of the reference pixels by use of the calculated weighting factors; and mixing a pixel value of the target pixel with the correction value on the basis of the detected isolation degree.

11. A non-transitory storage medium storing an image processing program which causes a computer to perform operations including:

calculating a similarity between a pixel value of a target pixel and a pixel value of a reference pixel located in a vicinity of the target pixel and a similarity between the pixel value of the target pixel and an average value of pixel values of reference pixels located in the vicinity of the target pixel, in an input image;

calculating a weighting factor respectively for the pixel value of the reference pixel and the average value of the pixel values of the reference pixels having such a similarity that a ratio or a difference with respect to a multiplication result of multiplying a highest similarity among the calculated similarities by a coefficient equal to or more than a first predetermined threshold is equal to or more than a second predetermined threshold, the weighting factor being higher when the ratio is lower or the difference is smaller;

calculating a weighted average value of the pixel value of the reference pixel and the average value of the pixel values of the reference pixels by use of the calculated weighting factors;

calculating a difference value between the pixel value of the target pixel and the weighted average value;

calculating an isolation degree to judge whether the target pixel is a pixel to be corrected on the basis of the calculated difference value; and correcting the target pixel on the basis of the calculated isolation degree.

12. A non-transitory storage medium storing an image processing program which causes a computer to perform operations including:

generate a target pixel feature vector having, as a component, a pixel value of a pixel included in a target pixel peripheral region which is a region including pixels on a periphery of a target pixel in an input image;

for each of a plurality of reference pixels, comparing, pixel by pixel, color information included in the target pixel peripheral region with color information included in a reference pixel peripheral region which is a region including pixels on a periphery of a reference pixel located in the vicinity of the target pixel, and generating (i) when the color information included in the target pixel peripheral region is totally equal to the color information included in the reference pixel peripheral region, a reference pixel feature vector having, as a component, a pixel value included in the reference pixel peripheral region, or (ii) when there is a pixel in which the color information included in the target pixel peripheral region is different from the color information included in the reference pixel peripheral region, a reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region;

calculating a similarity between the generated target pixel feature vector and each of the generated reference pixel feature vectors;

calculating a weighting factor respectively for the pixel value of each of the reference pixels having such a similarity that a ratio or a difference with respect to a multiplication result of multiplying a highest similarity among the calculated similarities by a coefficient equal to or more than a first predetermined threshold is equal to or more than a second predetermined threshold, whereby the weighting factor is higher when the ratio is lower or the difference is smaller;

calculating a weighted average value of the pixel values of the reference pixels by use of the weighting factors;

calculating a difference value between the pixel value of the target pixel and the weighted average value;

calculating an isolation degree to judge whether the target pixel is a pixel to be corrected on the basis of the calculated difference value; and correcting the target pixel on the basis of the calculated isolation degree.

13. A non-transitory storage medium storing an image processing program which causes a computer to perform operations including:

detecting an isolation degree of each pixel in an input image;

generating a target pixel feature vector having, as a component, a pixel value of a target pixel peripheral region which is a region including pixels on a periphery of a target pixel in the input image;

generating a target isolation degree feature vector having, as a component, an isolation degree included in the target pixel peripheral region for the isolation degree of the target pixel;

for each of a plurality of reference pixels, comparing, pixel by pixel, color information included in the target pixel peripheral region with color information included in a reference pixel peripheral region which is a region including pixels on a periphery of a reference pixel located in the vicinity of the target pixel, and generating (i) when the color information included in the target pixel peripheral region is totally equal to the color information included in the reference pixel peripheral region, a reference pixel feature vector having, as a component, a pixel value included in the reference pixel peripheral region and a reference isolation degree feature vector having, as a component, an isolation degree included in the reference pixel peripheral region, or (ii) when there is a pixel in which the color information included in the target pixel peripheral region is different from the color information included in the reference pixel peripheral region, generate a reference pixel feature vector having, as a component, a pixel value in which a pixel value of the pixel included in the reference pixel peripheral region and having color information different from color information of the target pixel peripheral region is replaced with a pixel value calculated by use of a pixel which is a pixel located on the periphery of a pixel included in the reference pixel peripheral region and having color information different from color information of the target pixel peripheral region and which has color information equal to color information of the target pixel peripheral region, and a reference isolation degree feature vector having, as a component, an isolation degree in which the isolation degree of the pixel included in the reference pixel peripheral region and having color information different from color information of the target pixel peripheral region is replaced with an isolation degree calculated by use of an isolation degree of a pixel which is a pixel located on the periphery of a pixel included in the reference pixel peripheral region and having color information different from color information of the target pixel peripheral region and which has color information equal to color information of the target pixel peripheral region;

calculating a similarity between the target pixel feature vector and each of the generated reference pixel feature vectors by use of the target isolation degree feature vector and the reference isolation degree feature vectors;

calculating a weighting factor of each of the reference pixels respectively, on the basis of the calculated similarity and the detected isolation degree;

calculating, as a correction value, a weighted average value of the reference pixels by use of the calculated weighting factors; and mixing a pixel value of the target pixel with the correction value on the basis of the detected isolation degree.

* * * * *